United States Patent
Brockway et al.

(10) Patent No.: US 10,306,122 B2
(45) Date of Patent: May 28, 2019

(54) MULTIFUNCTION END EFFECTOR

(71) Applicant: The Boeing Company, Chicago, IL (US)

(72) Inventors: Monica Joy Brockway, Kirkland, WA (US); Tanni Sisco, Mukilteo, WA (US); Fei Cai, Edmonds, WA (US); Todd Christopher Grossaint, Mukilteo, WA (US); Matthew Ryan Dunaj, St. Clair, MI (US); Mark William Brown, Memphis, MI (US); Brian Joseph Cobb, Columbiaville, MI (US); Michael George Payionk, Marysville, MI (US); Justin Ronald Via, Macomb, MI (US)

(73) Assignee: The Boeing Company, Chicago, IL (US)

( * ) Notice: Subject to any disclaimer, the term of this patent is extended or adjusted under 35 U.S.C. 154(b) by 590 days.

(21) Appl. No.: 14/963,487

(22) Filed: Dec. 9, 2015

(65) Prior Publication Data

US 2017/0165844 A1 Jun. 15, 2017

(51) Int. Cl.
*H04N 5/225* (2006.01)
(52) U.S. Cl.
CPC ......... *H04N 5/2256* (2013.01); *H04N 5/2252* (2013.01); *Y10S 901/31* (2013.01); *Y10S 901/41* (2013.01); *Y10S 901/44* (2013.01)
(58) Field of Classification Search
None
See application file for complete search history.

(56) References Cited

U.S. PATENT DOCUMENTS

| | | | | |
|---|---|---|---|---|
| 3,292,819 A * | 12/1966 | Ford | ...................... | B23P 19/003 221/236 |
| 2004/0005411 A1 * | 1/2004 | Hubert | ....................... | B25J 5/02 427/256 |
| 2007/0048118 A1 * | 3/2007 | Ogawa | ..................... | B25J 5/007 414/680 |
| 2008/0158353 A1 * | 7/2008 | McKinley | ............. | B60T 17/221 348/128 |
| 2009/0260413 A1 * | 10/2009 | Tomchick | .............. | B21D 43/00 72/481.1 |
| 2015/0266147 A1 * | 9/2015 | Reid | ..................... | B23P 21/004 29/525.01 |

OTHER PUBLICATIONS

Brockway et al., "Method and Apparatus for Multi-Stage Spar Assembly," U.S. Appl. No. 14/614,886, filed Feb. 5, 2015, 71 pages.

* cited by examiner

*Primary Examiner* — Charles Capozzi
(74) *Attorney, Agent, or Firm* — Yee & Associates, P.C.

(57) ABSTRACT

An end effector is provided. The end effector comprises a housing, a movement system within the housing, an inspection system, a collar installation system, and a sealant application system. The housing has an operating window. The movement system comprises at least one of a rotation mechanism or a number of linear slides. The inspection system is associated with the movement system. The collar installation system is associated with the movement system. The sealant application system is associated with the movement system. Activating the movement system positions any of the inspection system, the collar installation system, or the sealant application system in an active position relative to the operating window.

35 Claims, 20 Drawing Sheets

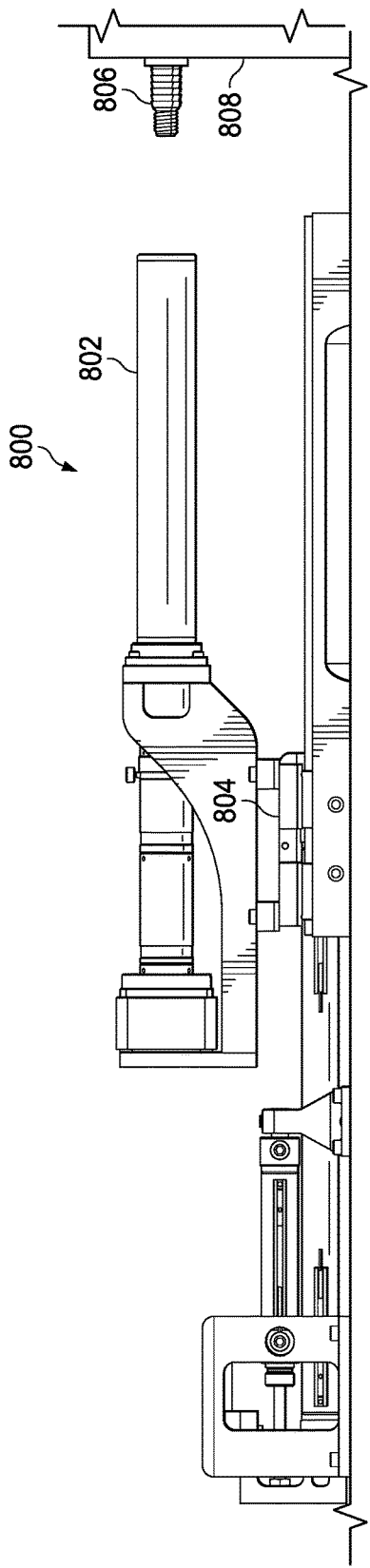
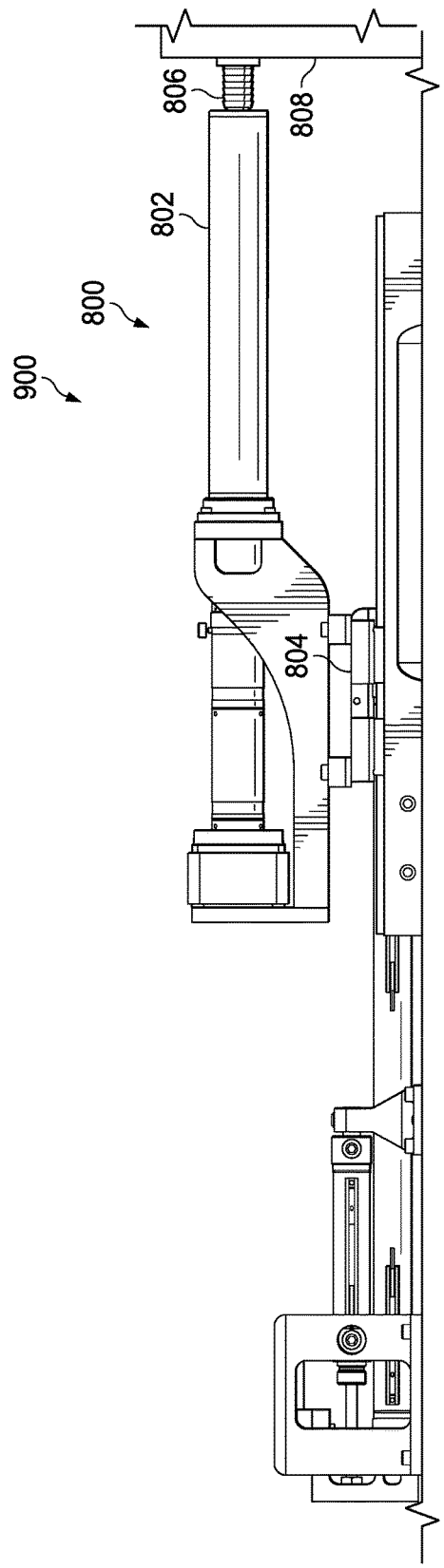

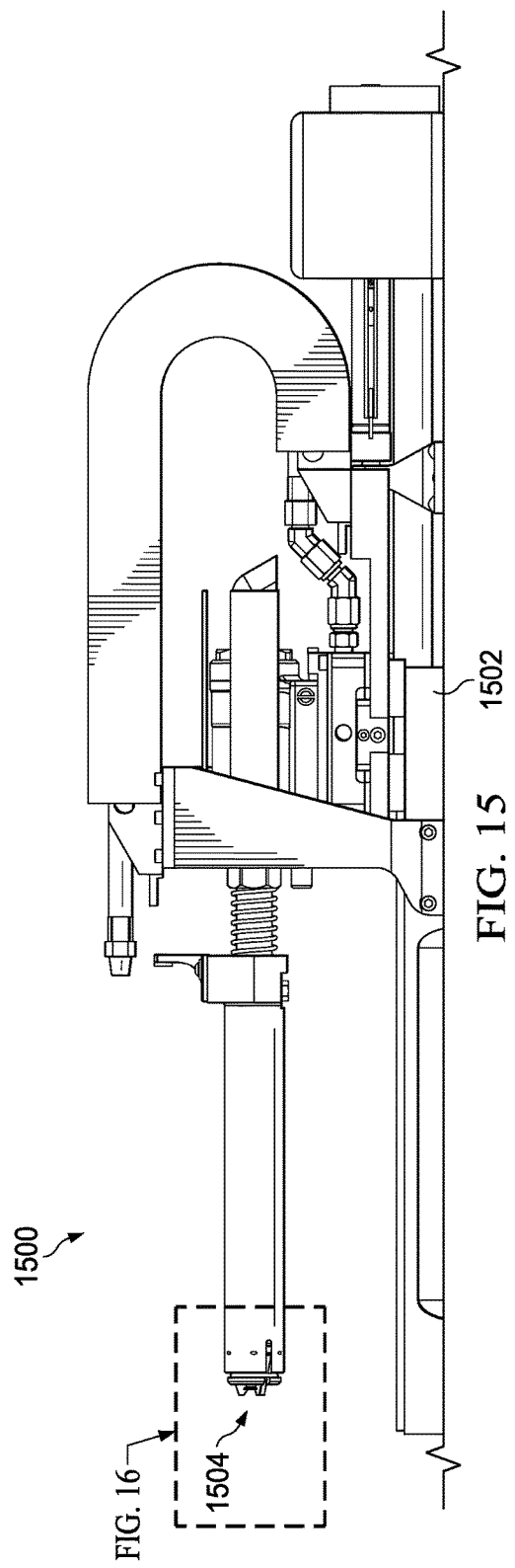
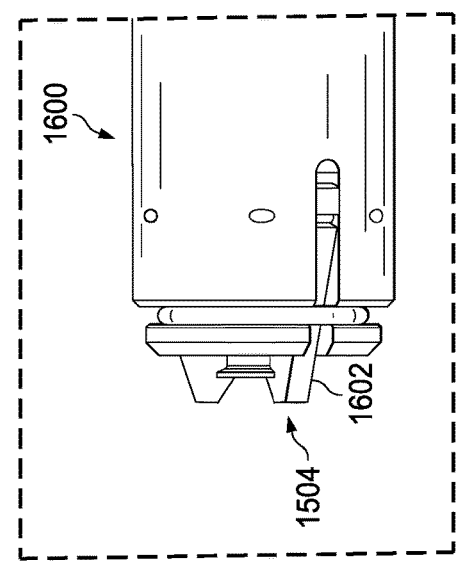
FIG. 15
FIG. 16

MULTIFUNCTION END EFFECTOR

BACKGROUND INFORMATION

1. Field

The present disclosure relates generally to building assemblies and, in particular, to performing multiple functions during building an assembly. Still more particularly, the present disclosure relates to a method and apparatus for performing multiple functions using an end effector during an assembly process.

2. Background

Some types of assemblies are currently being built manually. As one example, some currently available spar assemblies for aircraft are built manually by human operators. However, building a spar assembly manually may be more time-consuming than desired. Further, this type of manual assembly process may be more complex than desired. Still further, manually building spar assemblies may not provide the level of quality and consistency desired for spar assemblies.

Consequently, it may be desirable to automate portions of the assembly process using robotic systems. However, using robotic systems in a factory setting may be more difficult than desired. Currently available methods and systems for using robotic systems to perform certain types of assembly operations may not provide the type of mobility and flexibility within the factory that is desired. Therefore, it would be desirable to have a method and apparatus that take into account at least some of the issues discussed above, as well as other possible issues.

SUMMARY

In one illustrative embodiment, a C-frame end effector is provided. The C-frame end effector comprises a housing, a movement system within the housing, and a plurality of functional components associated with the movement system. The housing has an operating window. The movement system comprises at least one of a rotation mechanism or a number of linear slides. Each of the plurality of functional components is configured to perform a function on a structure through the operating window. Activating the movement system positions a functional component of the plurality of functional components in an active position relative to the operating window.

In another illustrative embodiment, an end effector is provided. The end effector comprises a housing, a movement system within the housing, an inspection system, a collar installation system, and a sealant application system. The housing has an operating window. The movement system comprises at least one of a rotation mechanism or a number of linear slides. The inspection system is associated with the movement system. The collar installation system is associated with the movement system. The sealant application system is associated with the movement system. Activating the movement system positions any of the inspection system, the collar installation system, or the sealant application system in an active position relative to the operating window.

In yet another illustrative embodiment, a sealant application system is provided. The sealant application system comprises a sealant source, a rigid housing, and a flexible sealant supply tube. The rigid housing has an orifice and a channel. The flexible sealant supply tube is positioned in the channel of the rigid housing and connected to the sealant source and the orifice.

In another illustrative embodiment, an inspection system is provided. The inspection system comprises a cylindrical housing, a mirror, a light source, and a camera. The mirror is inside the cylindrical housing and is positioned at a first end of the cylindrical housing.

In a further illustrative embodiment, a method is provided. An end effector is positioned relative to a structure. A first functional component is extended through an operating window of a housing of the end effector. A first function is performed on the structure using the first functional component extending through the operating window. The first functional component is retracted. A second functional component is extended through the operating window. A second function is performed on the structure using the second functional component extending through the operating window.

In yet a further illustrative embodiment, a method is provided. A collar attached to a shuttle is sent through a vacuum tube from a storage location to a transfer mechanism. The shuttle is retained in the transfer mechanism. The transfer mechanism is moved away from the vacuum tube and towards a collar installation system. The collar is grasped with the collar installation system. The collar is separated from the shuttle.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 8 is an illustration of a side view of an inspection system in accordance with an illustrative embodiment;

FIG. 9 is an illustration of a side view of an inspection system in accordance with an illustrative embodiment;

FIG. 15 is an illustration of a side view of a collar installation system in accordance with an illustrative embodiment;

FIG. 16 is an illustration of a side view of a portion of a collar installation system in accordance with an illustrative embodiment;

DETAILED DESCRIPTION

The different illustrative embodiments recognize and take into account one or more different considerations. For example, the illustrative embodiments recognize and take into account that current methods for fastener insertion inspection are manual processes. Further, conventional fastener insertion inspections may be more difficult than desired, the fasteners may be more difficult to access than desired, and the results may be inconsistent.

The different illustrative embodiments also recognize and take into account that manual collar fastening may have an undesirable amount of physical impact. Collar fastening may include undesirable audible impacts. It may be desirable to reduce the impact to workers. The different illustrative embodiments further recognize and take into account that worker health, safety, and ergonomics are important during manufacturing.

Figure 1:
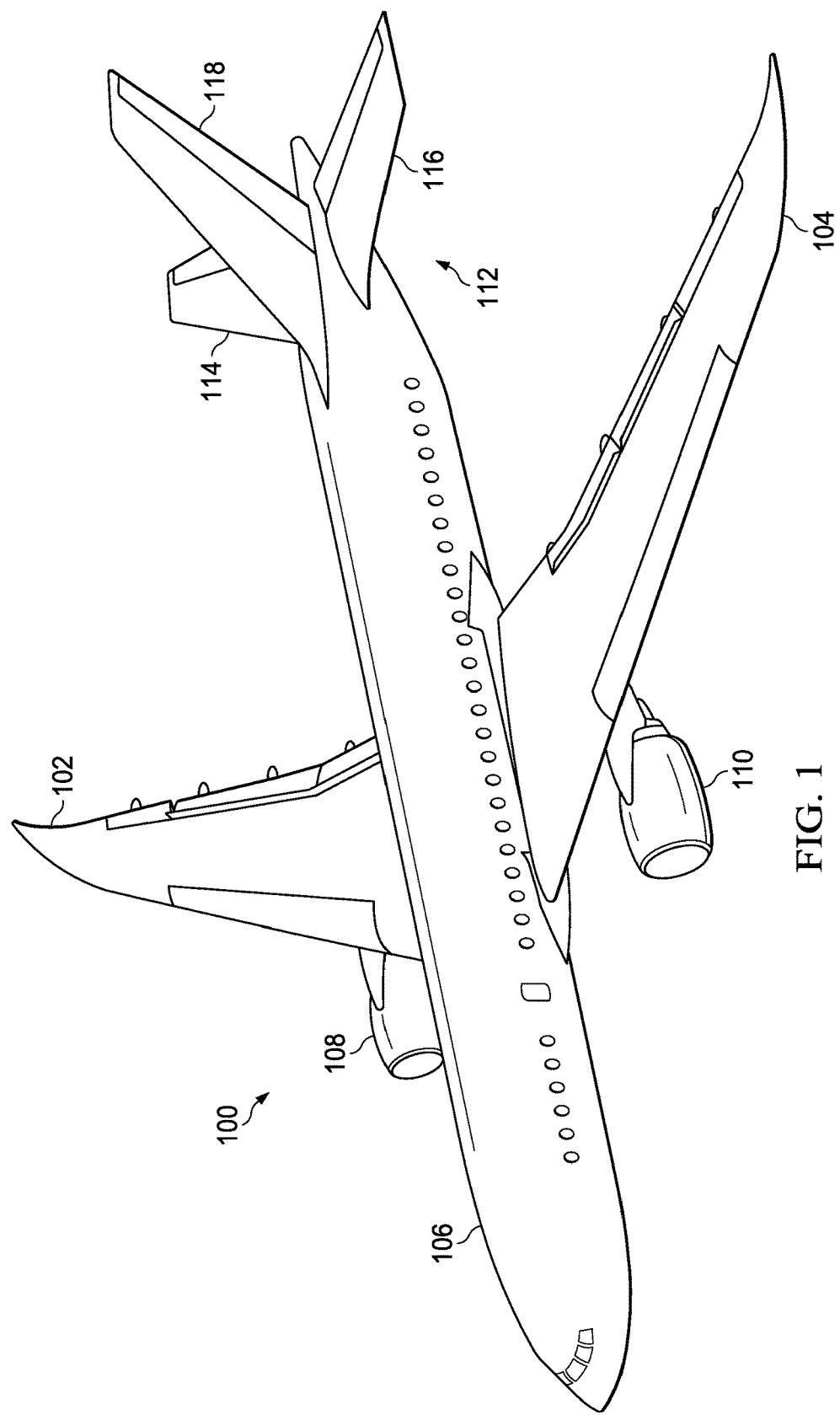
FIG. 1 is an illustration of an aircraft in which an illustrative embodiment may be implemented.

With reference now to the figures, and in particular, with reference to FIG. 1, an illustration of an aircraft is depicted in which an illustrative embodiment may be implemented. In this illustrative example, aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft having assemblies that may be built with a multi-function end effector in accordance with an illustrative embodiment. For example, spars in at least one of wing 102 or wing 104 may have manufacturing functions performed by a multi-function end effector.

This illustration of aircraft 100 is provided for purposes of illustrating one environment in which the different illustrative embodiments may be implemented. The illustration of aircraft 100 in FIG. 1 is not meant to imply architectural limitations as to the manner in which different illustrative embodiments may be implemented. For example, aircraft 100 is shown as a commercial passenger aircraft. The different illustrative embodiments may be applied to other types of aircraft, such as a private passenger aircraft, a rotorcraft, or other suitable types of aircraft.

Although the illustrative examples for an illustrative embodiment are described with respect to an aircraft, an illustrative embodiment may be applied to other types of platforms. The platform may be, for example, a mobile platform, a stationary platform, a land-based structure, an aquatic-based structure, or a space-based structure. More specifically, the platform may be a surface ship, a tank, a personnel carrier, a train, a spacecraft, a space station, a satellite, a submarine, an automobile, a manufacturing facility, a building, or other suitable platforms.

Figure 2:
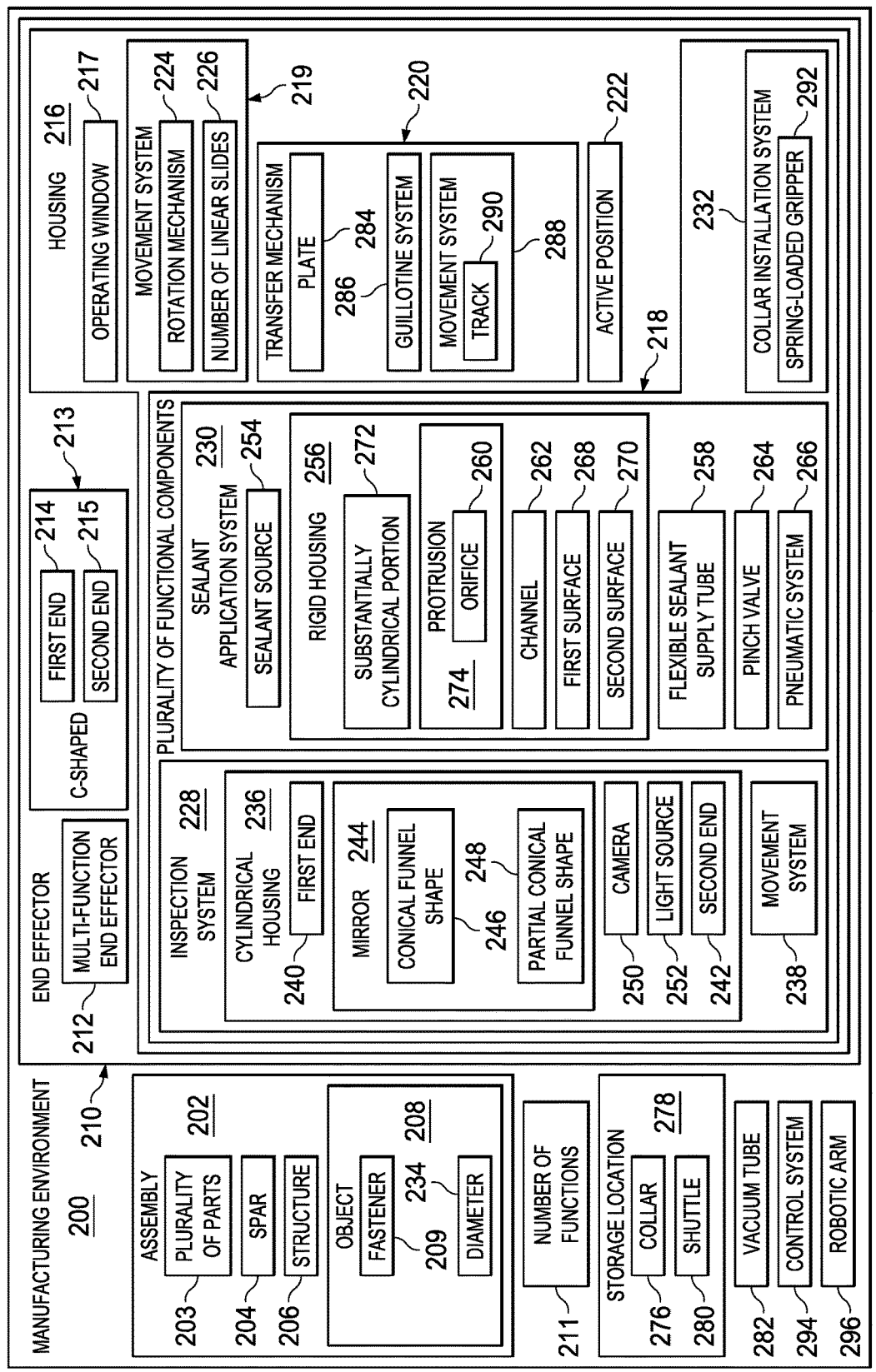
FIG. 2 is an illustration of a block diagram of a manufacturing environment in accordance with an illustrative embodiment.

With reference now to FIG. 2, an illustration of a block diagram of a manufacturing environment is depicted in accordance with an illustrative embodiment. Manufacturing environment 200 may be an example of an environment in which a component of aircraft 100 in FIG. 1 may be built. For example, assembly 202 may be a component of aircraft 100. Assembly 202 may take any desirable form. Assembly 202 may include plurality of parts 203. In some illustrative examples, assembly 202 may include spar 204.

In these illustrative examples, assembly 202 may refer to assembly 202 at any stage during the building of assembly 202. For example, without limitation, assembly 202 may refer to structure 206 only, structure 206 with one or more of a plurality of processes performed on structure 206, or structure 206 with one or more of a plurality of parts installed on structure 206.

Object 208 may extend through structure 206. Object 208 may take the form of any desirable component. In some illustrative examples, object 208 may take the form of fastener 209.

End effector 210 may perform number of functions 211 on structure 206. As used herein, "a number of," when used with reference to items, means one or more items. For example, "a number of functions" includes one or more functions.

In some illustrative examples, end effector 210 may be configured to perform a plurality of functions. When end effector 210 is configured to perform a plurality of functions, end effector 210 may be referred to as multi-function end effector 212.

End effector 210 may have any desirable shape. In some illustrative examples, end effector 210 may be C-shaped 213. When end effector 210 is C-shaped 213, end effector 210 may have first end 214 and second end 215.

End effector 210 includes housing 216 with operating window 217. Operating window 217 may be an opening in housing 216 through which plurality of functional components 218 may perform number of functions 211 on structure 206. In some illustrative examples, operating window 217 may be referred to as a working envelope.

Plurality of functional components 218, movement system 219, and transfer mechanism 220 may be contained within housing 216. Each of plurality of functional components 218 is configured to perform a function on structure 206 through operating window 217. Activating movement system 219 positions a functional component of plurality of functional components 218 in active position 222 relative to operating window 217. Active position 222 may be a position from which the functional component may extend through operating window 217. Whichever functional component of plurality of functional components 218 is in active position 222 may extend through operating window 217 to perform a respective function of number of functions 211 on structure 206.

Movement system 219 may include at least one of rotation mechanism 224 or number of linear slides 226. As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, thing, or a category.

For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations.

By activating movement system 219, at least one of plurality of functional components 218 may be moved relative to operating window 217. For example, using rotation mechanism 224 may move plurality of functional components 218 such that a desirable functional component is in active position 222 relative to operating window 217. Activating rotation mechanism 224 may change which of plurality of functional components 218 is in active position 222.

In some illustrative examples, movement system 219 may not include rotation mechanism 224. In these examples, activating number of linear slides 226 may change which of plurality of functional components 218 is in active position 222. Number of linear slides 226 may then extend the functional component in active position 222 through operating window 217.

In some illustrative examples, movement system 219 may include both rotation mechanism 224 and number of linear slides 226. In these illustrative examples, rotation mechanism 224 may change which of plurality of functional components 218 is in active position 222. Number of linear slides 226 may be used to extend the functional component in active position 222 through operating window 217.

Plurality of functional components 218 may include inspection system 228, sealant application system 230, and collar installation system 232. Inspection system 228 may take a number of measurements of object 208. As an example, inspection system 228 may take SP2 measurements for object 208. When object 208 takes the form of fastener 209, the SP2 measurement may be a distance measurement from the edge of a sleeve to a gage mark in a notch of fastener 209. The SP2 measurement may be a minimum dimension.

In some illustrative examples, inspection system 228 may be configured to radially inspect diameter 234 of object 208 from an axial position. In another example, inspection system 228 may perform SP1 measurements for fastener 209. A SP1 measurement may be a distance measurement from the edge of a sleeve around fastener 209 to structure 206.

Inspection system 228 includes cylindrical housing 236 and movement system 238. Movement system 238 is configured to move cylindrical housing 236 along a longitudinal axis of cylindrical housing 236. Movement system 238 may move cylindrical housing 236 such that cylindrical housing 236 may be positioned over object 208.

Cylindrical housing 236 has first end 240 and second end 242. Mirror 244 is inside cylindrical housing 236 and positioned at first end 240 of cylindrical housing 236. Mirror 244 may have one of conical funnel shape 246 or partial conical funnel shape 248.

Camera 250 is associated with second end 242 of cylindrical housing 236. Second end 242 of cylindrical housing 236 is opposite first end 240. Camera 250 may capture images of object 208. Mirror 244 may reflect images of object 208 for capture by camera 250. Sufficient ambient light may not be present in cylindrical housing 236 to capture desirable images.

Light source 252 may be associated with second end 242 of cylindrical housing 236. Light source 252 may provide a desirable amount of light for camera 250 to capture images of object 208.

Although inspection system 228 is depicted as a functional component of plurality of functional components 218, inspection system 228 may be independent of multi-function end effector 212. For example, inspection system 228 may be a hand tool. In another example, inspection system 228 may be an independent end effector.

After inspecting object 208, sealant may be applied to object 208 using sealant application system 230. Sealant application system 230 includes sealant source 254, rigid housing 256, and flexible sealant supply tube 258. Rigid housing 256 has orifice 260 and channel 262. Orifice 260 may be the deposition location for the sealant. Flexible sealant supply tube 258 is positioned in channel 262 of rigid housing 256 and is connected to sealant source 254 and orifice 260. Sealant may flow from sealant source 254 through flexible sealant supply tube 258 to orifice 260.

By sealant only flowing through flexible sealant supply tube 258, sealant may not contact mechanical components of sealant application system 230. Flexible sealant supply tube 258 may be formed of any desirable material. In some illustrative examples, flexible sealant supply tube 258 may be formed of a polymeric material. Polymeric materials may have desirable material properties and may be desirably inexpensive.

Pinch valve 264 is associated with rigid housing 256. Flexible sealant supply tube 258 is positioned within pinch valve 264 such that activating pinch valve 264 may compress flexible sealant supply tube 258 to stop the flow of sealant from flexible sealant supply tube 258.

Pneumatic system 266 may control sealant flow from sealant source 254 to flexible sealant supply tube 258. When pneumatic system 266 is activated, sealant may flow from sealant source 254. When pneumatic system 266 is deactivated, sealant may not flow from sealant source. Pneumatic system 266 may be a primary sealant controller.

Pinch valve 264 may be a secondary sealant controller. Pinch valve 264 may be positioned near orifice 260. Pinch valve 264 may stop sealant present in flexible sealant supply tube 258 from escaping flexible sealant supply tube 258 when pneumatic system 266 is deactivated.

Pinch valve 264 may be positioned within rigid housing 256. When pinch valve 264 is positioned within rigid housing 256, flexible sealant supply tube 258 may run from first surface 268 of rigid housing 256 to second surface 270 of rigid housing 256. First surface 268 is opposite second surface 270. Channel 262 may extend longitudinally along first surface 268 and second surface 270 of rigid housing 256.

In some illustrative examples, rigid housing 256 may have substantially cylindrical portion 272 and protrusion 274 extending longitudinally from cylindrical portion 272. Orifice 260 may be positioned within protrusion 274. In some illustrative examples, protrusion 274 may be referred to as a "finger."

Orifice 260 may be moved towards object 208 using movement system 219, such as number of linear slides 226. Orifice 260 may apply sealant to object 208 as orifice is being moved at least one of towards or away from object 208 using a movement system, such as movement system 219. In some other illustrative examples, sealant application system 230 may have its own movement system (not depicted).

Although sealant application system 230 is depicted as a functional component of plurality of functional components 218, sealant application system 230 may be independent of multi-function end effector 212. For example, sealant application system 230 may be a hand tool. In another example, sealant application system 230 may be an independent end effector.

After applying sealant using sealant application system 230, the sealant may be inspected. The sealant may be inspected using any desirable type of inspector.

When object 208 takes the form of fastener 209, collar 276 may be installed onto fastener 209. Collar 276 may be installed onto fastener 209 after applying sealant using sealant application system 230. Collar 276 may be installed onto fastener 209 using collar installation system 232. Collar installation system 232 may install collar 276 onto fastener 209 using any desirable mechanism.

Prior to installation, collar 276 may be stored in storage location 278. In some illustrative examples, storage location 278 may be separate from end effector 210. In other illustrative examples, storage location 278 may be connected to end effector 210, such that storage location 278 moves when end effector 210 moves. In some illustrative examples, storage location 278 may store a plurality of collars. In some illustrative examples, the plurality of collars may be stored in stacks in storage location 278.

Prior to installation, collar 276 may be attached to shuttle 280. In some illustrative examples, collar 276 may be attached to shuttle 280 prior to storage in storage location 278. In other illustrative examples, collar 276 may be attached to shuttle 280 in storage location 278.

Collar 276 and shuttle 280 may be sent from storage location 278 through vacuum tube 282 to transfer mechanism 220. Transfer mechanism 220 may retain shuttle 280. To retain shuttle 280, plate 284 may slide within transfer mechanism 220. Plate 284 may slide until plate 284 engages a portion of shuttle 280. In some illustrative examples, plate 284 of transfer mechanism 220 may be part of guillotine system 286 that retains shuttle 280.

While retaining shuttle 280 in transfer mechanism 220, transfer mechanism 220 moves away from vacuum tube 282 and towards collar installation system 232. Transfer mechanism 220 moves using movement system 288. In some illustrative examples, movement system 288 may include track 290.

When transfer mechanism 220 is positioned relative to collar installation system 232, collar installation system 232 grasps collar 276. Collar installation system 232 uses spring-loaded gripper 292 to grasp collar 276. In some illustrative examples, collar installation system 232 may include any desirable collar swager in addition to spring-loaded gripper 292. Spring-loaded gripper 292 may grasp collar 276 after a linear slide of number of linear slides 226 moves collar installation system 232 towards transfer mechanism 220. Movement of collar installation system 232 using movement system 219 such as number of linear slides 226 may be in a direction perpendicular to the movement of transfer mechanism 220 using movement system 288.

After grasping collar 276, collar installation system 232 may separate collar 276 from shuttle 280. Separating collar 276 from shuttle 280 may include retracting collar installation system 232 from transfer mechanism 220 while grasping collar 276 with collar installation system 232.

After separating collar 276 from shuttle 280, transfer mechanism 220 may move towards vacuum tube 282. Shuttle 280 may be removed from transfer mechanism 220 using vacuum tube 282.

In some illustrative examples, after shuttle 280 is removed from transfer mechanism 220, shuttle 280 may be reused. In these examples, vacuum tube 282 may return shuttle 280 to storage location 278. Shuttle 280 may be stored for future use. In other illustrative examples, after shuttle 280 is removed from transfer mechanism 220, shuttle 280 may be discarded. Shuttle 280 may be formed of a material desirably inexpensive if shuttle 280 is disposable.

After separating collar 276, spring-loaded gripper 292 may hold collar 276. Collar installation system 232 may then install collar 276 onto fastener 209. Collar installation system 232 may install collar 276 using a collar swaging component (not depicted). The collar swaging component may take any desirable form.

Control system 294 may be comprised of a set of controllers. In this illustrative example, each of the set of controllers in control system 294 may be implemented using software, hardware, firmware, or a combination thereof. When software is used, the operations performed by the controller may be implemented using, for example, without limitation, program code configured to run on a processor unit. When firmware is used, the operations performed by the controller may be implemented using, for example, without limitation, program code and data and stored in persistent memory to run on a processor unit.

When hardware is employed, the hardware may include one or more circuits that operate to perform the operations performed by the controller. Depending on the implementation, the hardware may take the form of a circuit system, an integrated circuit, an application specific integrated circuit (ASIC), a programmable logic device, or some other suitable type of hardware device configured to perform any number of operations.

A programmable logic device may be configured to perform certain operations. The device may be permanently configured to perform these operations or may be reconfigurable. A programmable logic device may take the form of, for example, without limitation, a programmable logic array, a programmable array logic, a field programmable logic array, a field programmable gate array, or some other type of programmable hardware device.

In some illustrative examples, the operations and/or processes performed by the controller may be performed using organic components integrated with inorganic components. In some cases, the operations and/or processes may be performed by entirely organic components, excluding a human being. As one illustrative example, circuits in organic semiconductors may be used to perform these operations and/or processes.

In these illustrative examples, one or more of the set of controllers that form control system 294 may be associated with one or more components of end effector 210. In some examples, end effector 210 may be connected to robotic arm 296. In some illustrative examples, one or more of the set of controllers that form control system 294 may be associated with robotic arm 296.

When end effector 210 is C-shaped 213, components within housing 216 may be positioned in one of first end 214 or second end 215. For example, when end effector 210 is C-shaped 213, plurality of functional components 218 may be positioned in first end 214. In another example, plurality of functional components 218 may be positioned in second end 215.

The illustration of manufacturing environment 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, plurality of functional components 218 may include additional functional components not depicted in FIG. 2. In some illustrative examples, plurality of functional components 218 may also include a sealant inspector, a drill, a hole inspector, or other desirable functional components. As another example, end effector 210 may also include a clamp foot. When a clamp foot is present, plurality of functional components 218 may perform functions on structure 206 through the clamp foot. The clamp foot may be in line with operating window 217.

In some illustrative examples, clamping may be performed to hold end effector 212 relative to assembly 202 while plurality of functional components 218 are operating. In other illustrative examples, clamping may be performed to hold assembly 202 or structure 206 prior to fastening together structure 206. A clamp may be a component of end effector 212 or external to end effector 212.

As another example, when end effector 210 is C-shaped 213, additional functional components may be positioned in the other side of the C-shape from plurality of functional components 218. For example, when plurality of functional components 218 is in first end 214, a different set of functional components may be positioned in second end 215.

As yet a further example, although each of inspection system 228, sealant application system 230, and collar installation system 232 are described as components of multi-function end effector 212, any of plurality of functional components 218 may be a component of a single function end effector. Further, any of plurality of functional components 218 may be used manually. For example, an operator may perform functions by hand using at least one of inspection system 228, sealant application system 230, or collar installation system 232.

Figure 3:
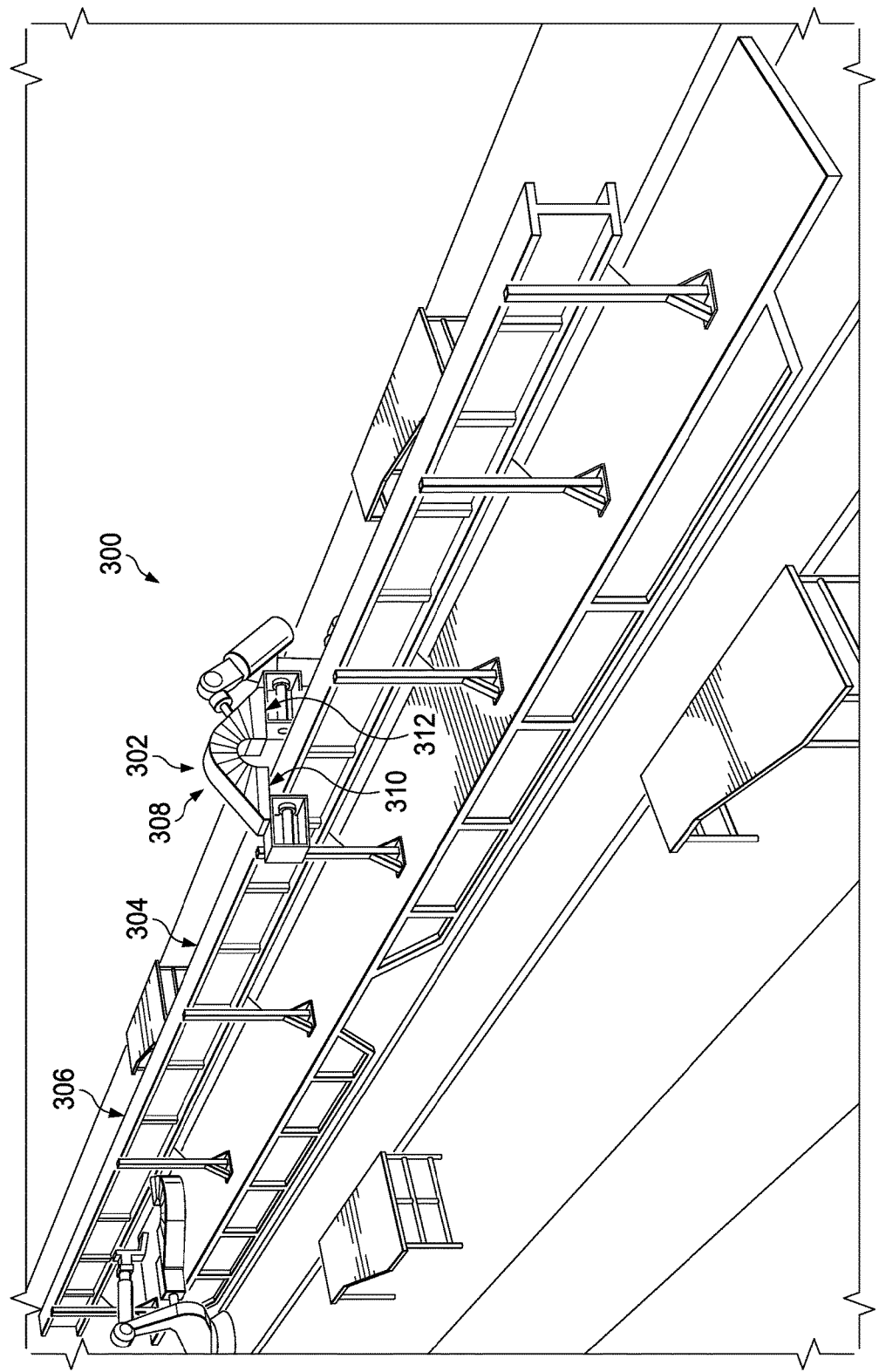
FIG. 3 is an illustration of a manufacturing environment with a multi-function end effector in accordance with an illustrative embodiment.

Turning now to FIG. 3, an illustration of a manufacturing environment with a multi-function end effector is depicted in accordance with an illustrative embodiment. Manufacturing environment 300 may be a physical implementation of manufacturing environment 200 in FIG. 2. Multi-function end effector 302 may be one example of a physical implementation of multi-function end effector 212 in FIG. 2. Multi-function end effector 302 may be used to perform functions on structure 304. In this illustrative example, structure 304 takes the form of spar 306. As depicted, multi-functional end effector 302 is C-shaped 308. However, in other illustrative examples, multi-functional end effector 302 may have any desirable shape. For example, multi-functional end effector 302 may instead be cylindrical.

In some illustrative examples, plurality of functional components 218 in FIG. 2 may be positioned in first end 310 of multi-functional end effector 302. In other illustrative examples, plurality of functional components 218 in FIG. 2 may be positioned in second end 312 of multi-functional end effector 302.

Turning now to FIGS. 4-7, illustrations of a side view of a multi-function end effector with a portion of the housing removed are depicted in accordance with an illustrative embodiment. Multi-function end effector 400 may be a physical implementation of multi-function end effector 212 in FIG. 2. In some illustrative examples, multi-function end effector 400 may be a portion of multi-function end effector 302 in FIG. 3.

Figure 4:
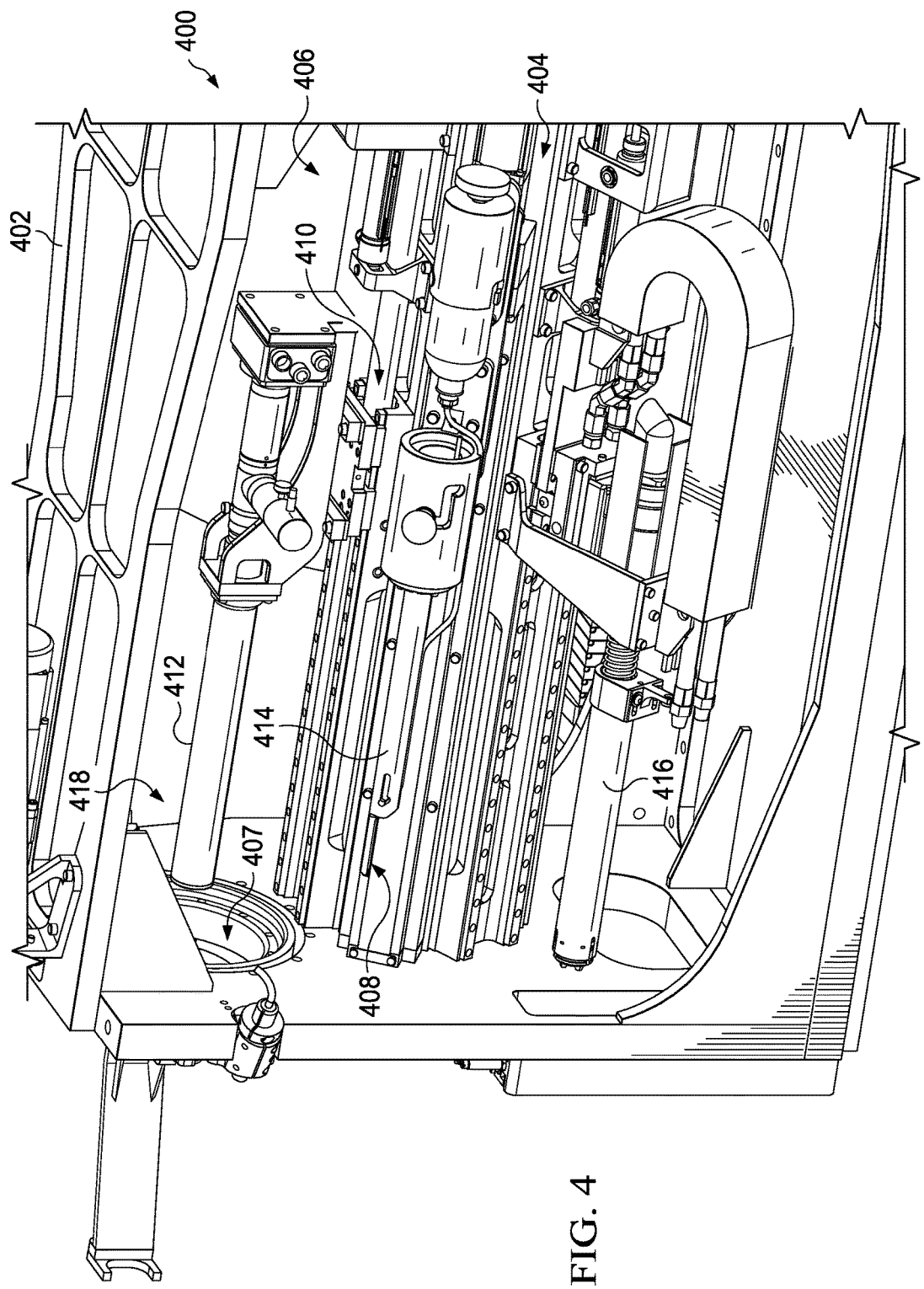
FIGS. 4-7 are illustrations of a side view of a multi-function end effector with a portion of the housing removed in accordance with an illustrative embodiment.

With reference now to FIG. 4, an illustration of a side view of a multi-function end effector with a portion of the housing removed is depicted in accordance with an illustrative embodiment. Multi-function end effector 400 includes housing 402, movement system 404, and plurality of functional components 406. Housing 402 includes operating window 407. Plurality of functional components 406 may perform functions on a structure (not depicted) through operating window 407.

In this illustrative example, movement system 404 includes both rotation mechanism 408 and number of linear slides 410. Plurality of functional components 406 may be extended through operating window 407 using a respective one of number of linear slides 410. In some other examples, movement system 404 may not include rotation mechanism 408.

In this illustrative example, plurality of functional components 406 includes inspection system 412, sealant application system 414, and collar installation system 416. As depicted, inspection system 412 is in active position 418 relative to operating window 407.

Figure 5:
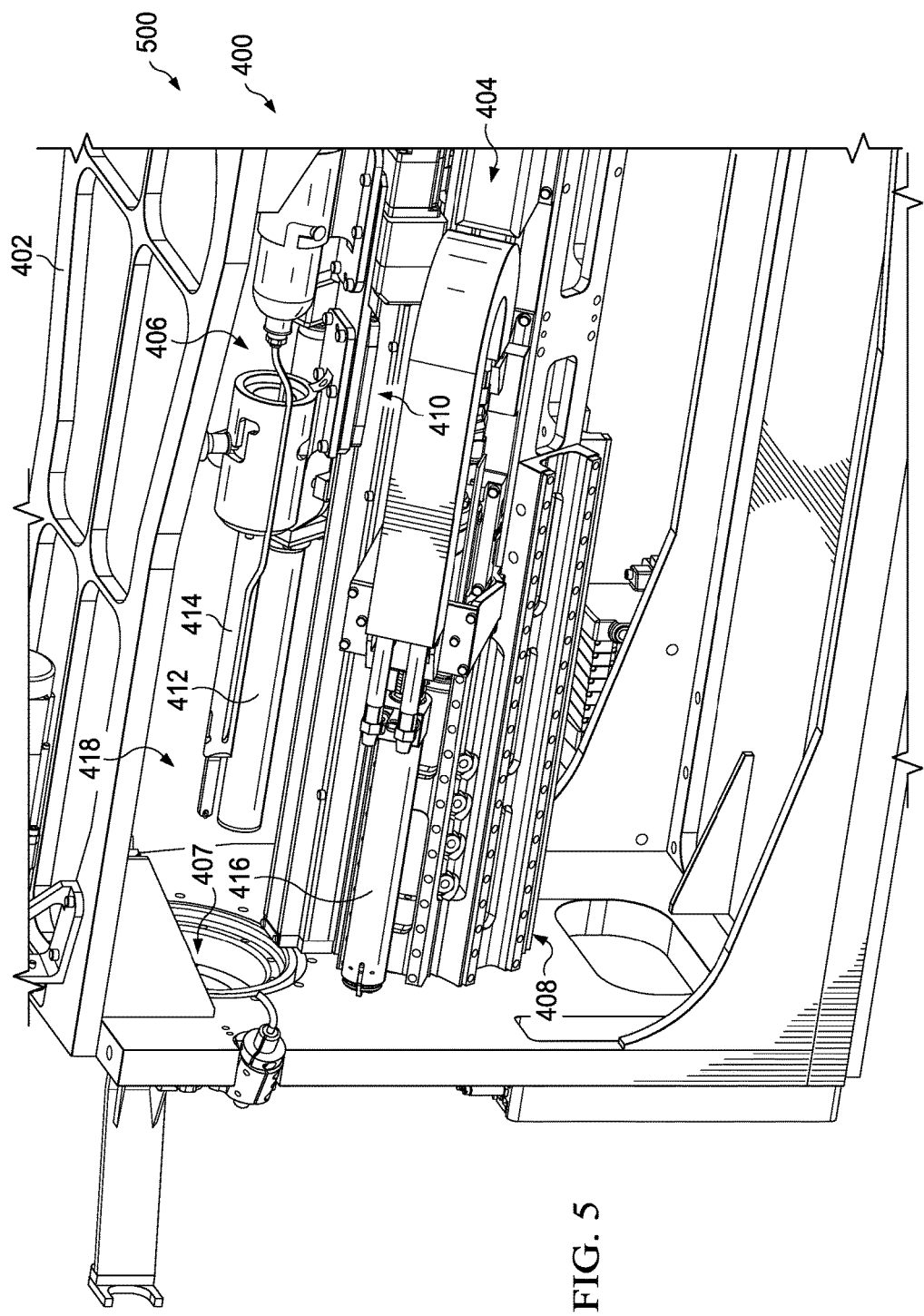

With reference now to FIG. 5, in view 500, plurality of functional components 406 has moved relative to operating window 407. In this illustrative example, plurality of functional components 406 is rotated using rotation mechanism 408. In view 500, sealant application system 414 is in active position 418 relative to operating window 407.

Figure 6:
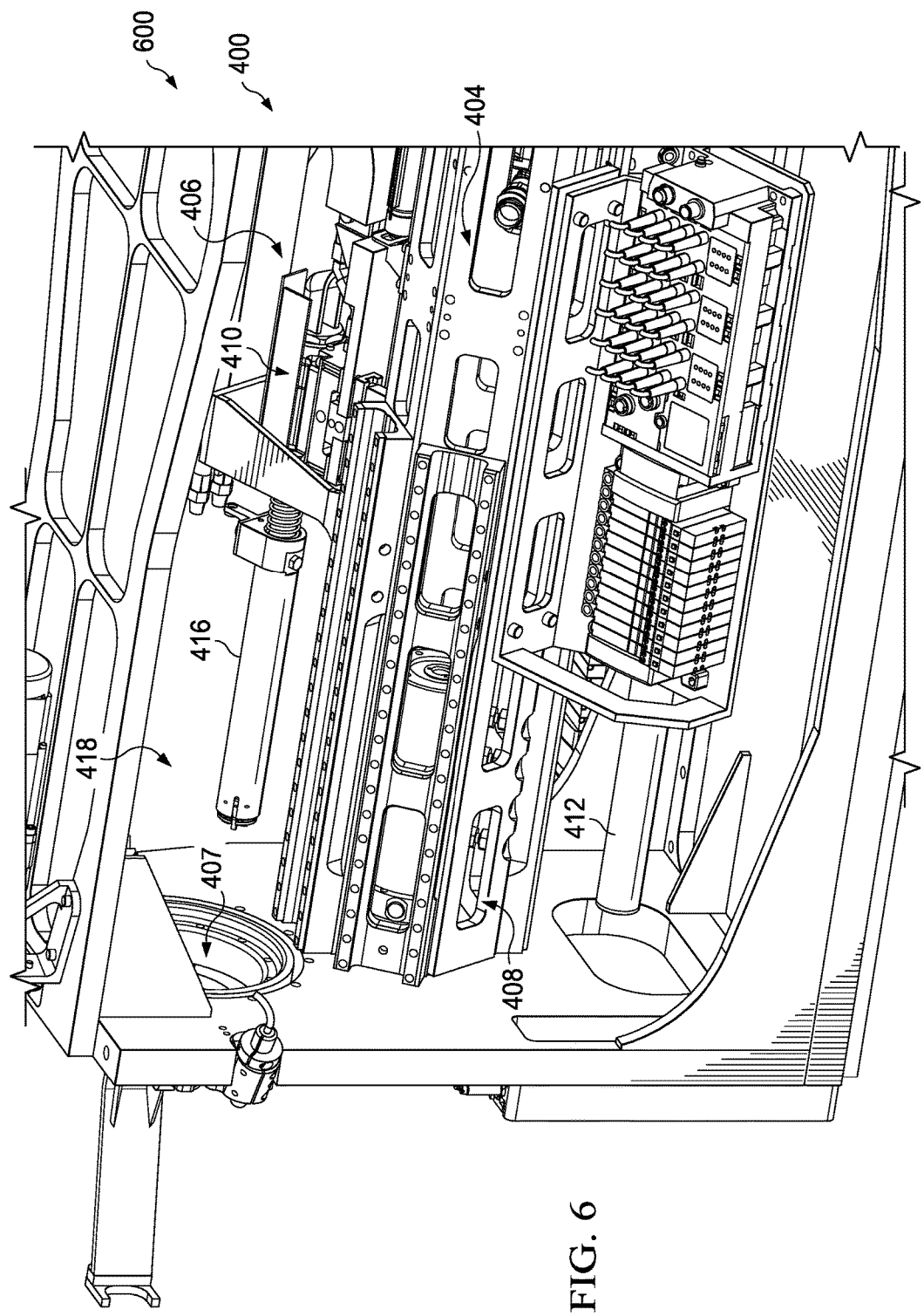

With reference now to FIG. 6, in view 600, plurality of functional components 406 has moved relative to operating window 407. In this illustrative example, plurality of functional components 406 is rotated using rotation mechanism 408. In view 600, collar installation system 416 is in active position 418 relative to operating window 407.

Figure 7:
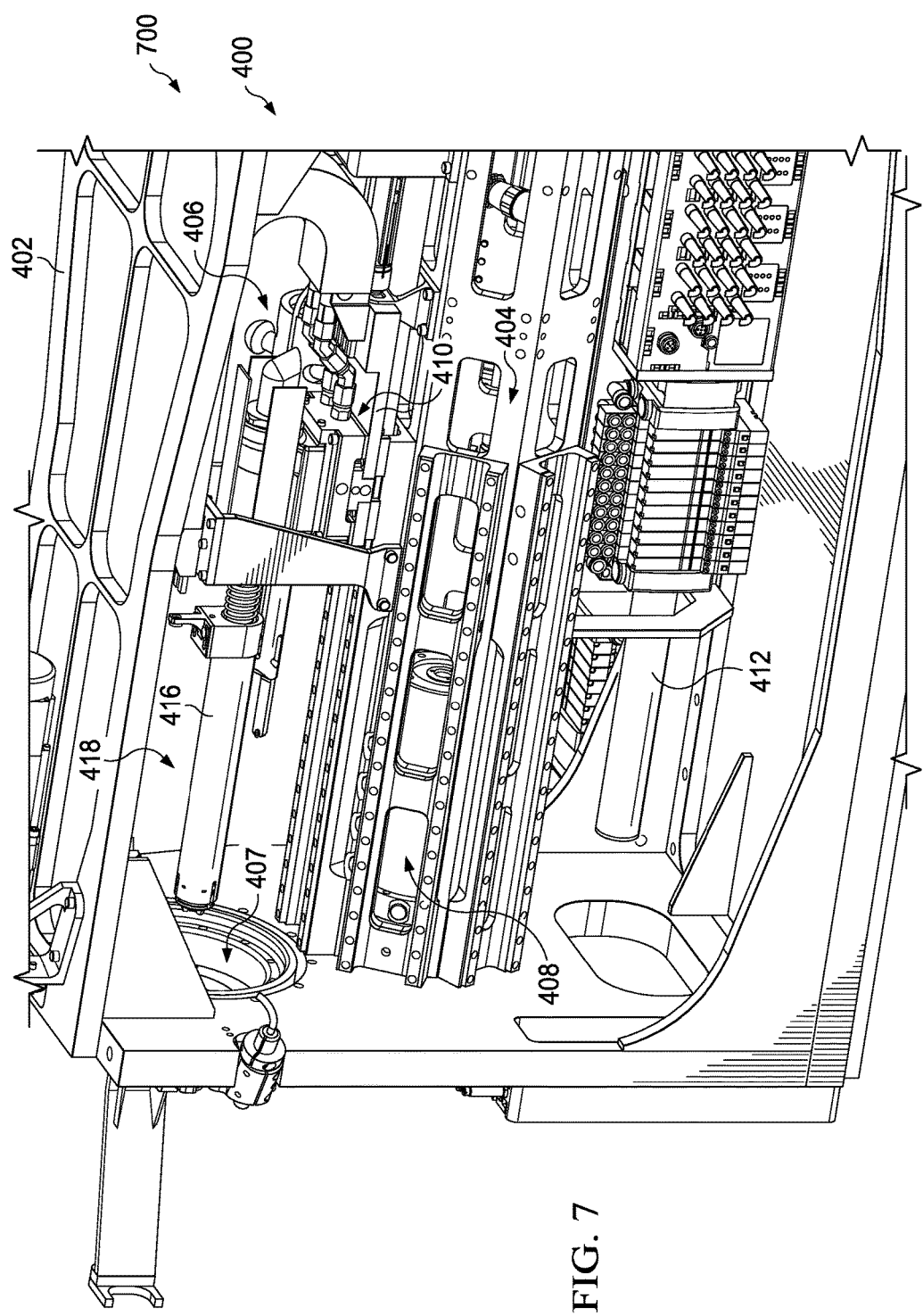

With reference now to FIG. 7, in view 700, collar installation system 416 has moved relative to operating window 407. Collar installation system 416 has moved towards operating window 407 using one of number of linear slides 410.

Turning now to FIG. 8, an illustration of a side view of an inspection system is depicted in accordance with an illustrative embodiment. Inspection system 800 may be a physical implementation of inspection system 228 in FIG. 2. In some examples, inspection system 800 may be the same as inspection system 412 in FIGS. 4-7.

In some illustrative examples, inspection system 800 may be a component of a multi-function end effector, such as multi-function end effector 212 of FIG. 2. In other illustrative examples, inspection system 800 may be a single function end effector. In another illustrative example, inspection system 800 may be held and used to perform manual functions by an operator.

Inspection system 800 has cylindrical housing 802 associated with linear slide 804. Inspection system 800 is configured to inspect fastener 806 extending from structure 808. To inspect fastener 806, cylindrical housing 802 may be lowered such that cylindrical housing 802 is positioned over fastener 806 using linear slide 804.

Turning now to FIG. 9, an illustration of a side view of an inspection system is depicted in accordance with an illustrative embodiment. View 900 may be a view of inspection system 800 as cylindrical housing 802 is moved over fastener 806.

Figure 10:
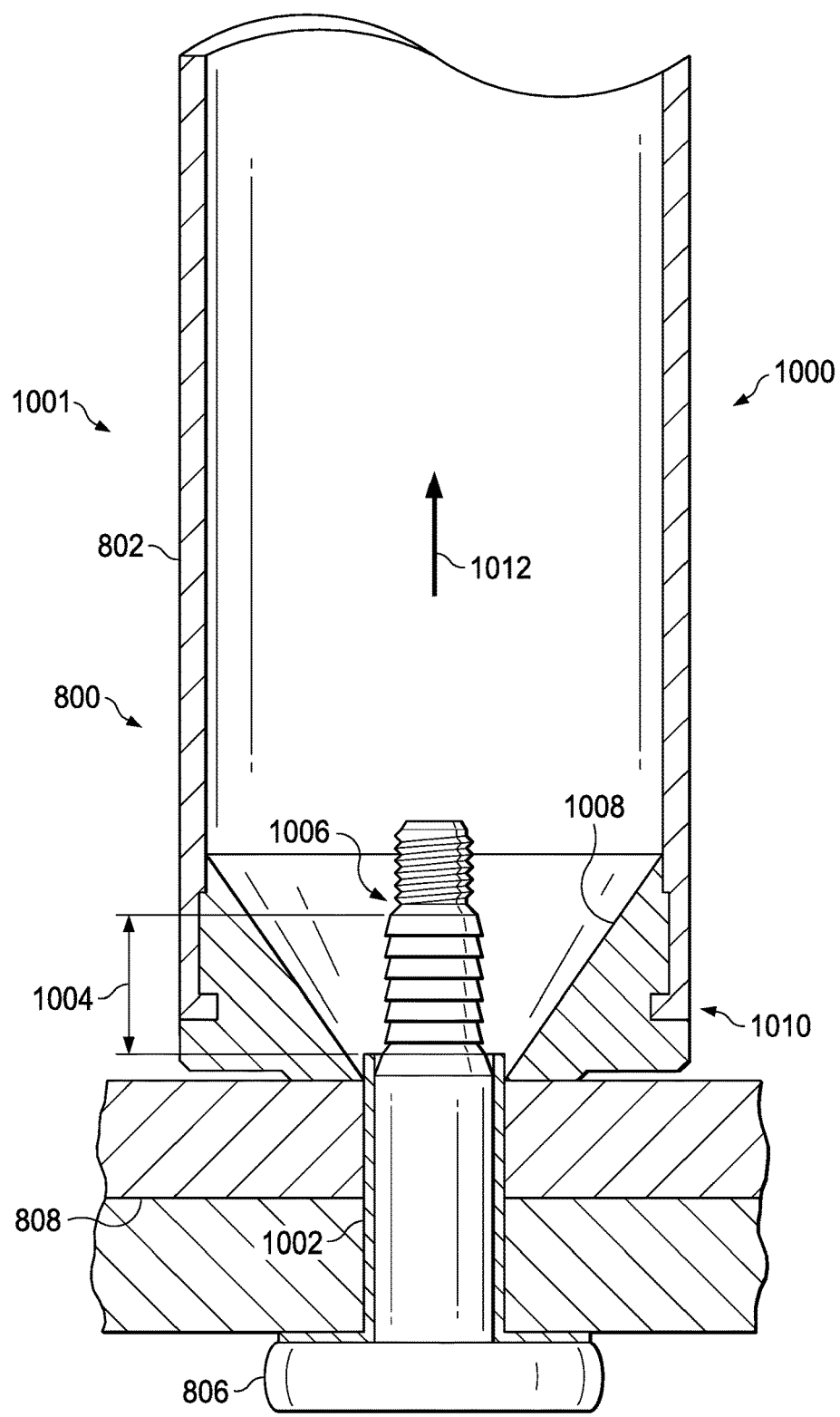
FIG. 10 is an illustration of a cross-sectional view of an inspection system over a fastener in accordance with an illustrative embodiment.

Turning now to FIG. 10, an illustration of a cross-sectional view of an inspection system over a fastener is depicted in accordance with an illustrative embodiment. View 1000 may be a view of inspection system 800 in position 1001 over fastener 806.

As depicted, fastener 806 extends through structure 808. Sleeve 1002 covers portions of fastener 806. Length 1004 is between the top of sleeve 1002 and gage mark 1006 in the notch of fastener 806. Length 1004 may be referred to as a SP2 measurement.

To reflect images of sleeve 1002 and fastener 806, mirror 1008 is positioned inside cylindrical housing 802. Mirror 1008 is positioned at first end 1010 of cylindrical housing 802. Mirror 1008 may reflect images of sleeve 1002 and fastener 806 in direction 1012 towards second end (not depicted). A camera (not depicted) may be positioned at the second end of cylindrical housing 802.

Figure 11:
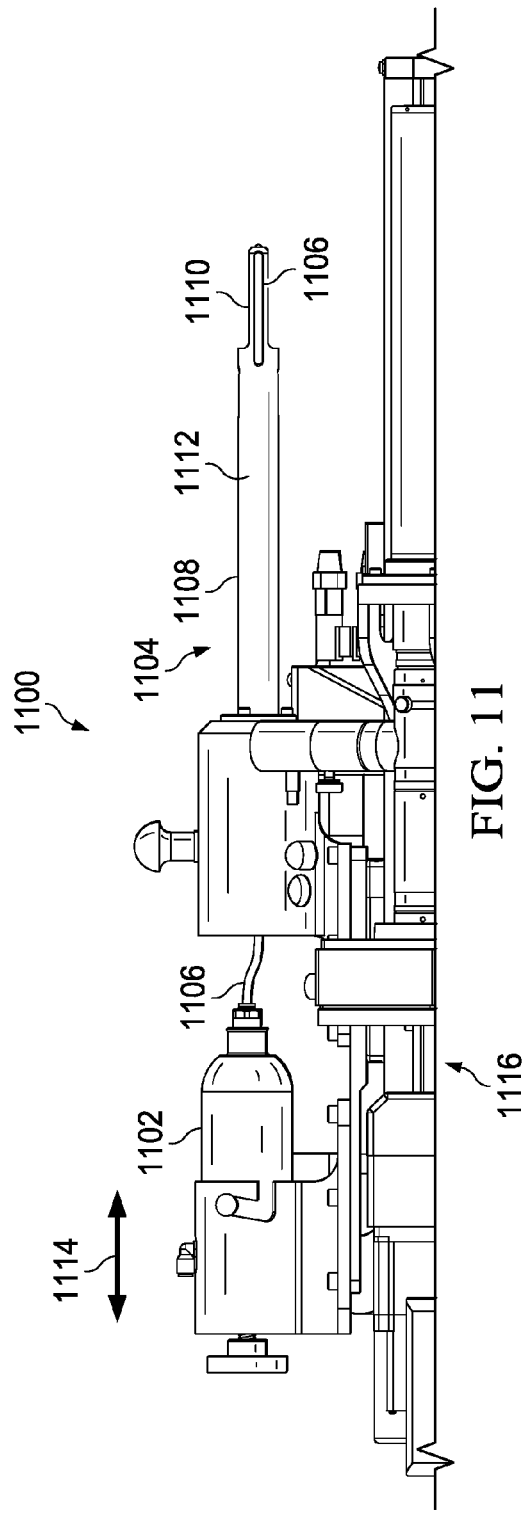
FIG. 11 is an illustration of a back view of a sealant application system in accordance with an illustrative embodiment.

Turning now to FIG. 11, an illustration of a back view of a sealant application system is depicted in accordance with an illustrative embodiment. Sealant application system 1100 may be a physical implementation of sealant application system 230 in FIG. 2. In some examples, sealant application system 1100 may be the same as sealant application system 414 in FIGS. 4-7.

In some illustrative examples, sealant application system 1100 may be a component of a multi-function end effector, such as multi-function end effector 212 of FIG. 2. In other illustrative examples, sealant application system 1100 may be a single function end effector. In another illustrative example, sealant application system 1100 may be held and used to perform manual functions by an operator.

Sealant application system 1100 includes sealant source 1102, rigid housing 1104, and flexible sealant supply tube 1106. Rigid housing 1104 includes substantially cylindrical portion 1108 and protrusion 1110. As depicted, protrusion 1110 extends longitudinally from substantially cylindrical portion 1108. Flexible sealant supply tube 1106 is connected to sealant source 1102. Sealant may flow from sealant source 1102 through flexible sealant supply tube 1106 towards protrusion 1110. Flexible sealant supply tube 1106 may be positioned in a channel (not depicted) on first surface 1112.

Sealant application system 1100 may move in direction 1114 to deposit sealant onto an object. Linear slide 1116 may be used to move sealant application system 1100 in direction 1114.

Figure 12:
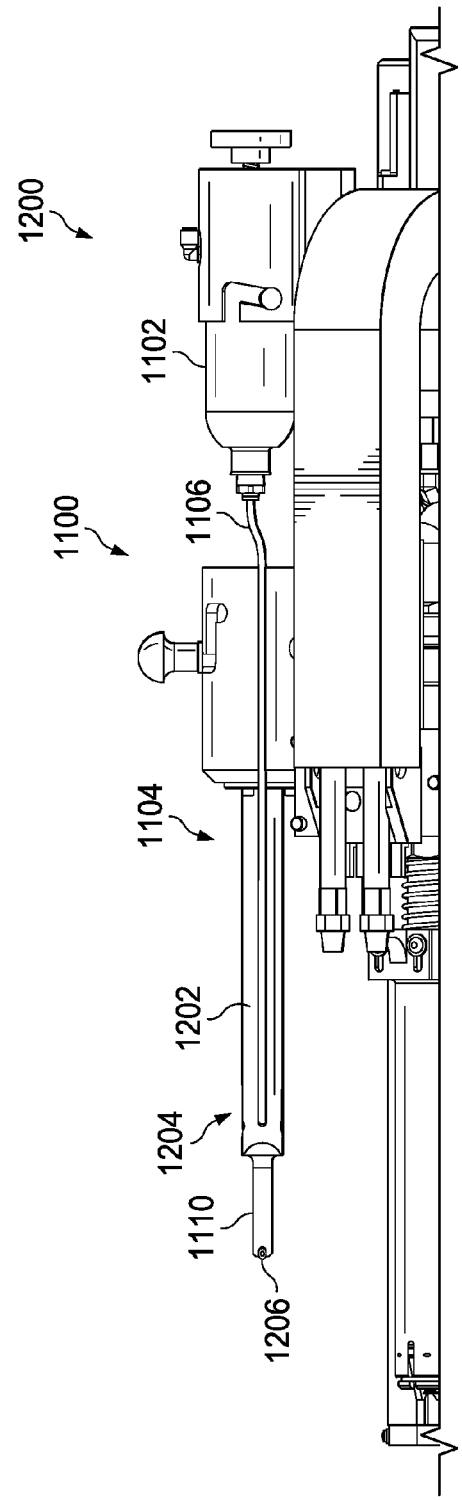
FIG. 12 is an illustration of a front view of a sealant application system in accordance with an illustrative embodiment.

Turning now to FIG. 12, an illustration of a front view of a sealant application system is depicted in accordance with an illustrative embodiment. As depicted in view 1200, flexible sealant supply tube 1106 may be positioned in a channel (not depicted) on second surface 1202. Second surface 1202 is opposite first surface 1112 in FIG. 11.

Flexible sealant supply tube 1106 may extend through rigid housing 1104 near location 1204. A pinch valve (not depicted) may be present inside rigid housing 1104 near location 1204. The pinch valve may stop sealant from flowing from flexible sealant supply tube 1106.

Flexible sealant supply tube 1106 may be connected to orifice 1206. As depicted, orifice 1206 is positioned within protrusion 1110. Sealant (not depicted) may be deposited from orifice 1206 onto an object (not depicted).

Figure 13:
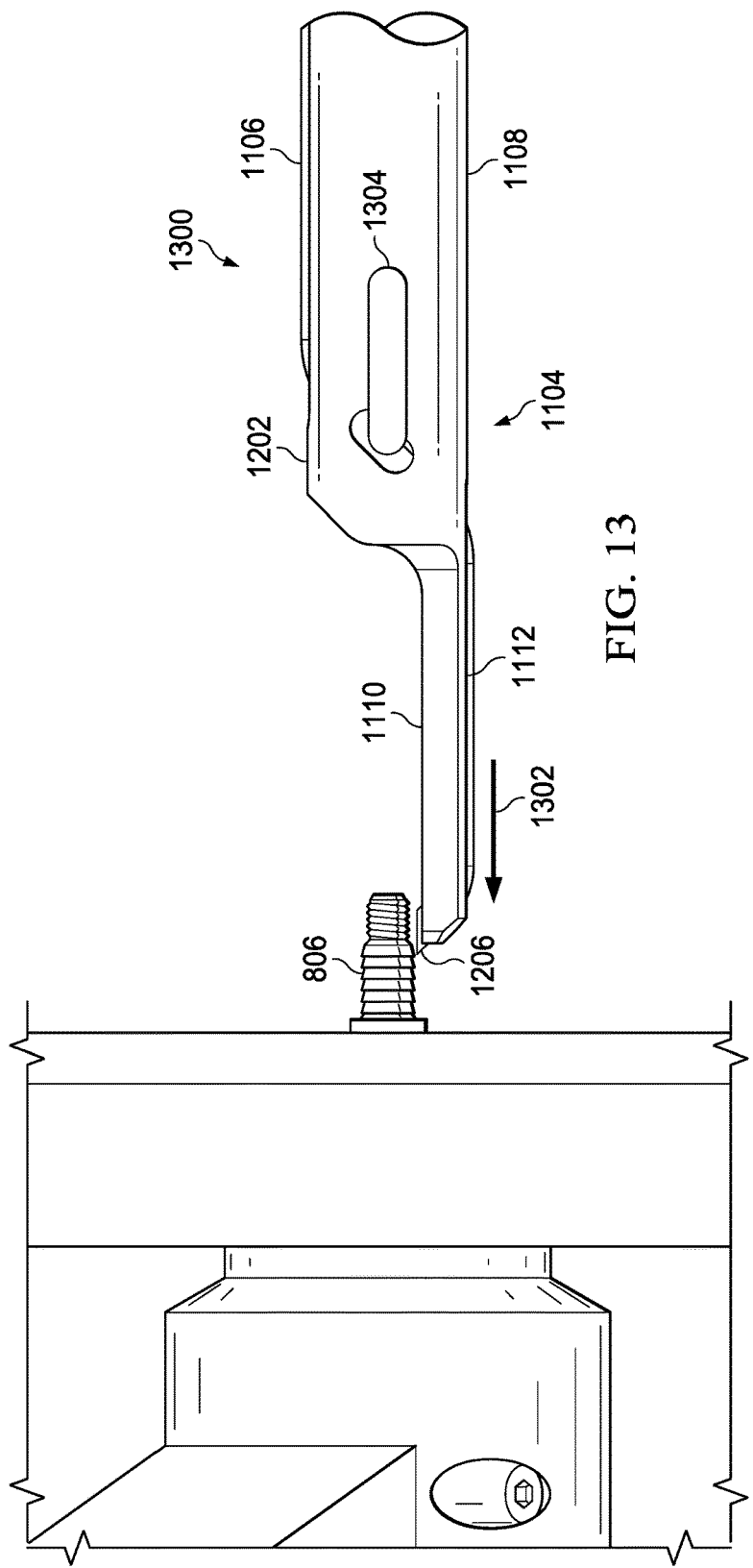
FIG. 13 is an illustration of a side view of a sealant application system applying sealant to a fastener in accordance with an illustrative embodiment.

Turning now to FIG. 13, an illustration of a side view of a sealant application system applying sealant to a fastener is depicted in accordance with an illustrative embodiment. View 1300 may be a view of sealant application system 1100 moving relative to fastener 806. More specifically, view 1300 may be a view of sealant application system 1100 moving towards fastener 806. As depicted, sealant application system 1100 moves in direction 1302. In some illustrative examples, sealant may flow from orifice 1206 as sealant application system 1100 moves in direction 1302.

In view 1300, pinch valve 1304 is visible. As depicted, flexible sealant supply tube 1106 travels through rigid housing 1104 from second surface 1202 to first surface 1112. As flexible sealant supply tube 1106 extends through rigid housing 1104, flexible sealant supply tube 1106 is positioned within pinch valve 1304.

Figure 14:
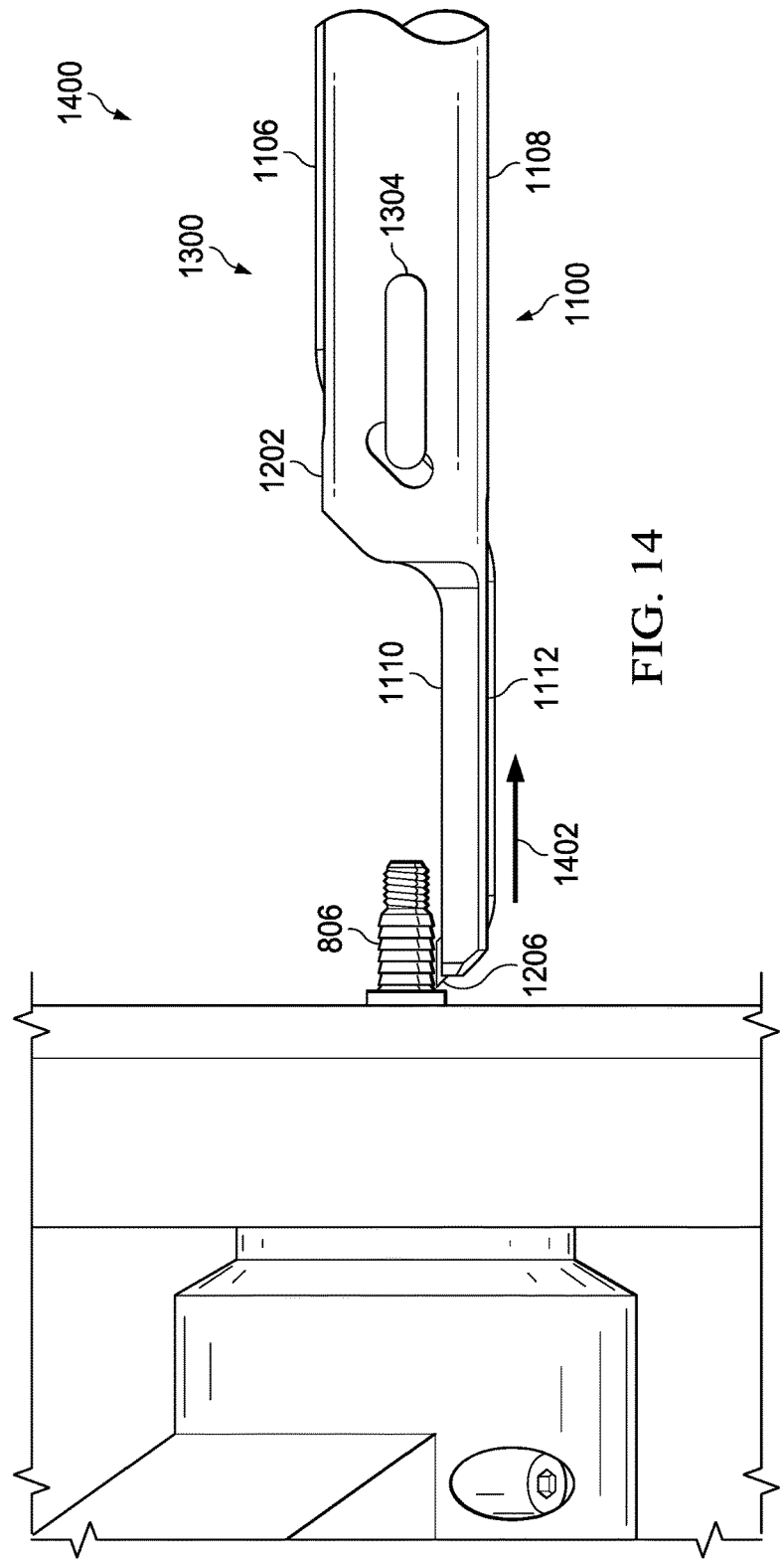
FIG. 14 is another illustration of a side view of a sealant application system applying sealant to a fastener in accordance with an illustrative embodiment.

Turning now to FIG. 14, another illustration of a side view of a sealant application system applying sealant to a fastener is depicted in accordance with an illustrative embodiment. View 1400 may be a view of sealant application system 1100 moving relative to fastener 806. More specifically, view 1400 may be a view of sealant application system 1100 moving away from fastener 806. As depicted, sealant application system 1100 moves in direction 1402. In some illustrative examples, sealant may flow from orifice 1206 as sealant application system 1100 moves in direction 1402.

In some illustrative examples, sealant application system 1100 may move in additional directions other than just direction 1402. For example, sealant application system 1100 may move in a direction perpendicular to direction 1402. By moving in a direction perpendicular to direction 1402, sealant application system 1100 may apply sealant to fasteners of a variety of diameters.

Turning now to FIG. 15, an illustration of a side view of a collar installation system is depicted in accordance with an illustrative embodiment. Collar installation system 1500 may be a physical implementation of collar installation system 232 in FIG. 2. In some examples, collar installation system 1500 may be an implementation of collar installation system 416 in FIGS. 4-7.

In some illustrative examples, collar installation system 1500 may be a component of a multi-function end effector, such as multi-function end effector 212 of FIG. 2. In other illustrative examples, collar installation system 1500 may be a single function end effector. In another illustrative example, collar installation system 1500 may be held and used to perform manual functions by an operator.

Collar installation system 1500 may be connected to linear slide 1502. Collar installation system 1500 may move towards or away from an object using linear slide 1502. Collar installation system 1500 is configured to grasp a collar (not depicted). More specifically, spring-loaded gripper 1504 may grasp a collar (not depicted).

Turning now to FIG. 16, an illustration of a side view of a portion of a collar installation system is depicted in accordance with an illustrative embodiment. View 1600 may be a view of collar installation system 1500 within box 16 in FIG. 15. As depicted, spring-loaded gripper 1504 may include plurality of spring-loaded fingers 1602. In this illustrative example, plurality of spring-loaded fingers 1602 includes three spring-loaded fingers.

Figure 17:
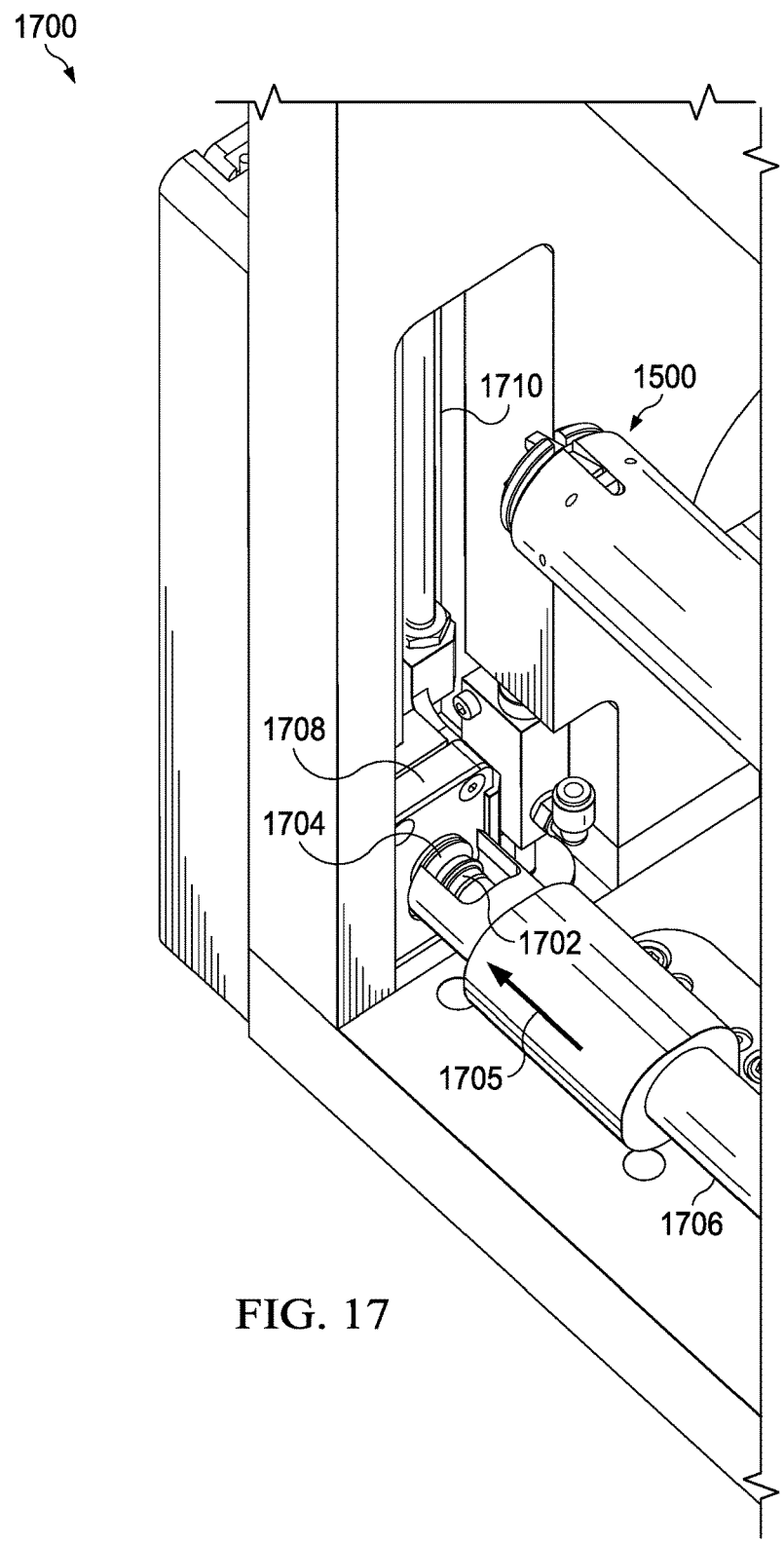
FIG. 17 is an illustration of a transfer mechanism in operation in accordance with an illustrative embodiment.

Turning now to FIG. 17, an illustration of a transfer mechanism in operation is depicted in accordance with an illustrative embodiment. Transfer mechanism 1700 may be a physical implementation of transfer mechanism 220 in FIG. 2. As depicted, transfer mechanism 1700 may interact with collar installation system 1500 to transfer a collar to collar installation system 1500.

Collar 1702 and attached shuttle 1704 may travel in direction 1705 through vacuum tube 1706 towards transfer mechanism 1708. Once collar 1702 and attached shuttle 1704 reach transfer mechanism 1708, transfer mechanism 1708 may retain shuttle 1704.

Transfer mechanism 1708 may then move away from vacuum tube 1706 along track 1710. By moving away from vacuum tube 1706, transfer mechanism 1708 may move towards collar installation system 1500.

Figure 18:
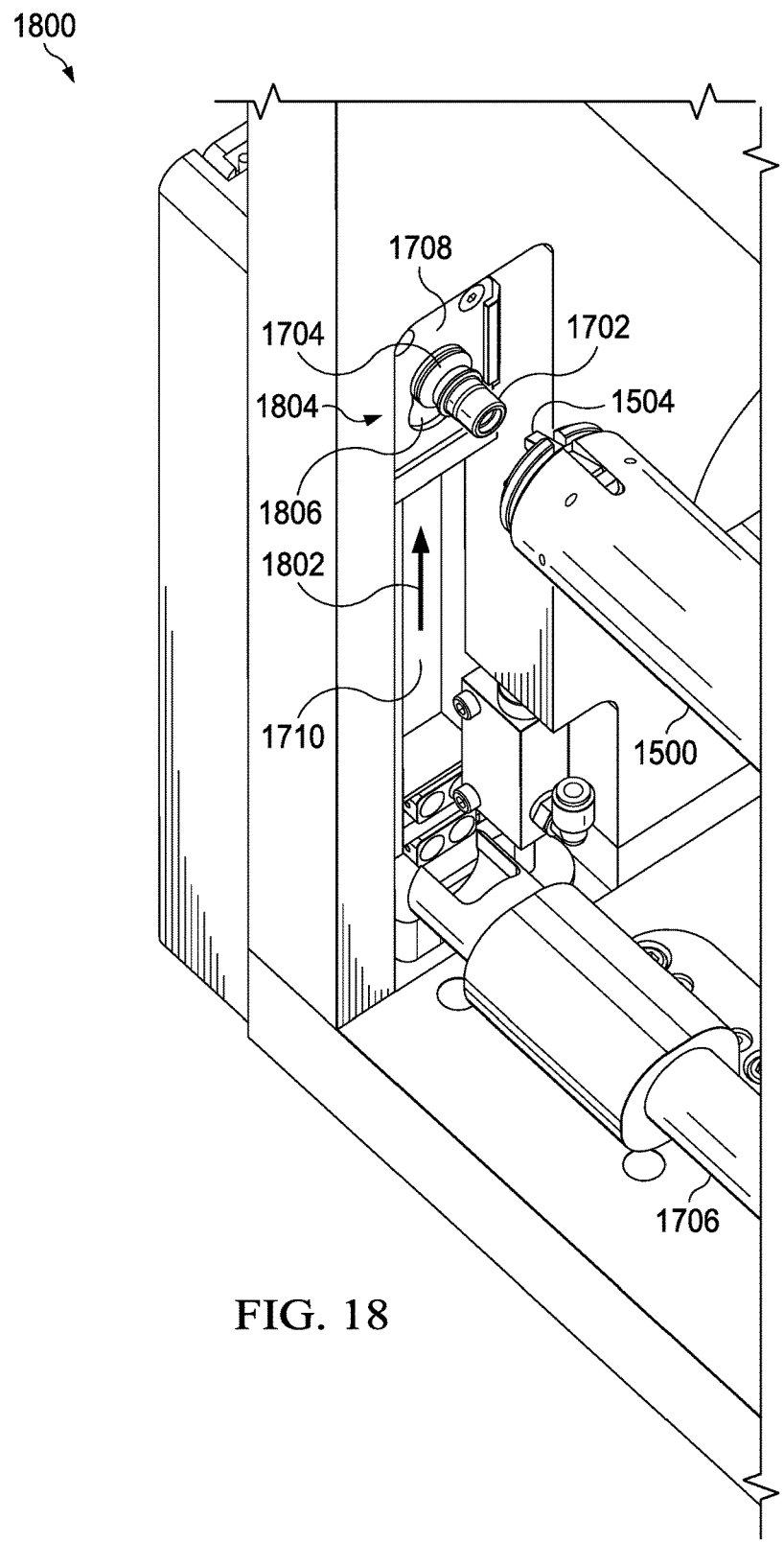
FIG. 18 is another illustration of a transfer mechanism in operation in accordance with an illustrative embodiment.

Turning now to FIG. 18, another illustration of a transfer mechanism in operation is depicted in accordance with an illustrative embodiment. In view 1800, transfer mechanism 1708 has moved in direction 1802 along track 1710. Transfer mechanism 1708 is positioned at location 1804 so that transfer mechanism 1708 is positioned desirably relative to spring-loaded gripper 1504 of collar installation system 1500.

In view 1800, plate 1806 of transfer mechanism 1708 is visible. Plate 1806 contacts a portion of shuttle 1704 to retain shuttle 1704 in transfer mechanism 1708. In some illustrative examples, plate 1806 may be a part of a guillotine system.

Figure 19:
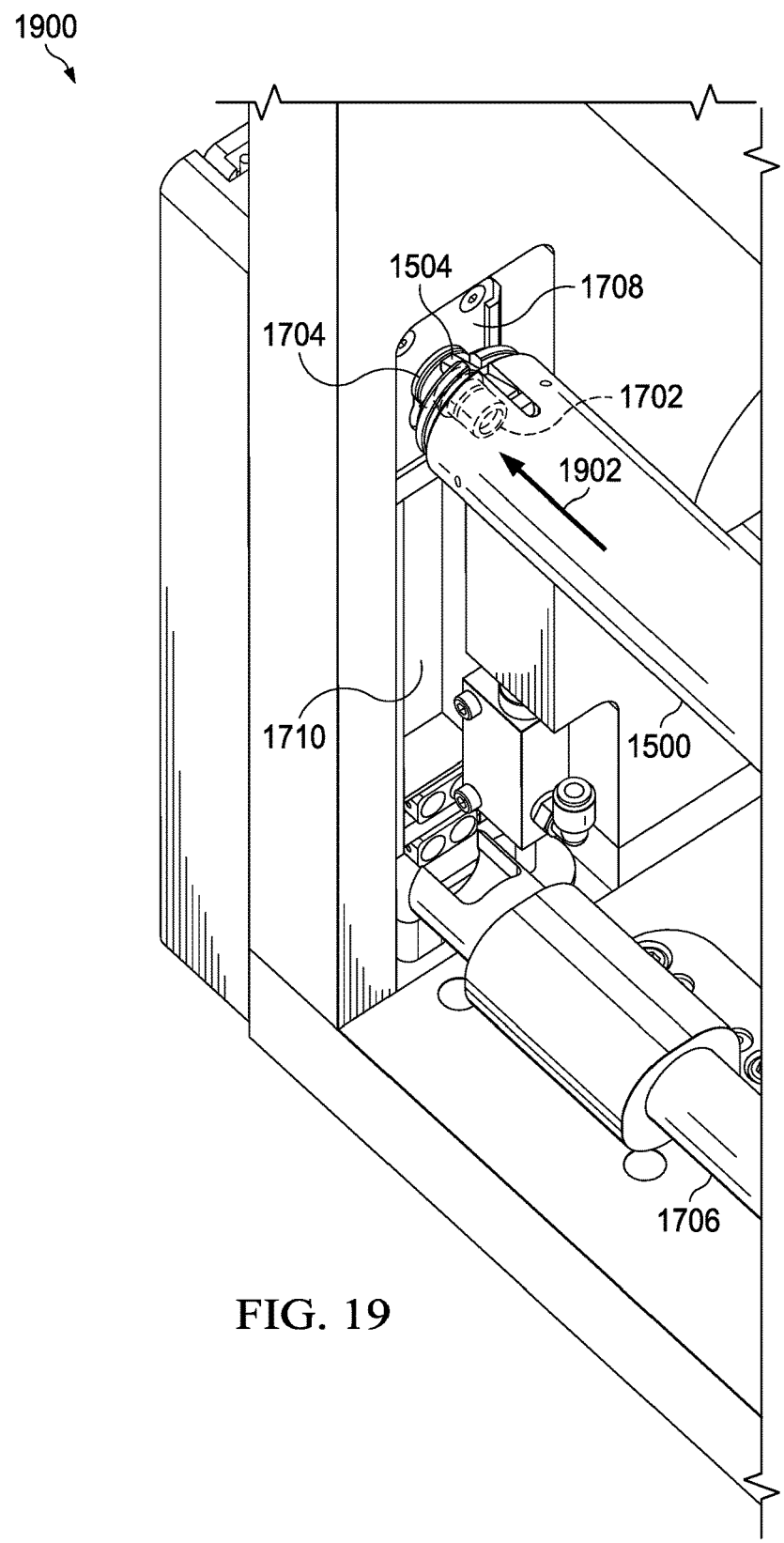
FIG. 19 is yet another illustration of a transfer mechanism in operation in accordance with an illustrative embodiment.

Turning now to FIG. 19, yet another illustration of a transfer mechanism in operation is depicted in accordance with an illustrative embodiment. In view 1900, collar installation system 1500 moves in direction 1902 towards transfer mechanism 1708. After moving in direction 1902, spring-loaded gripper 1504 of collar installation system 1500 may grasp collar 1702. After spring-loaded gripper 1504 grasps collar 1702, collar installation system 1500 may retract from transfer mechanism 1708 to separate collar 1702 from shuttle 1704.

After collar 1702 is separated from shuttle 1704, transfer mechanism 1708 may travel on track 1710 towards vacuum tube 1706. In some illustrative examples, shuttle 1704 may be removed from transfer mechanism 1708 by vacuum tube 1706 once transfer mechanism 1708 is opposite the vacuum tube 1706.

After removal from transfer mechanism 1708, shuttle 1704 may be stored for future use. For example, shuttle 1704 may be stored in a storage location (not depicted) in which a plurality of collars and attached shuttles are stored. In another example, after removal from transfer mechanism 1708, shuttle 1704 may be disposed of.

Figure 20:
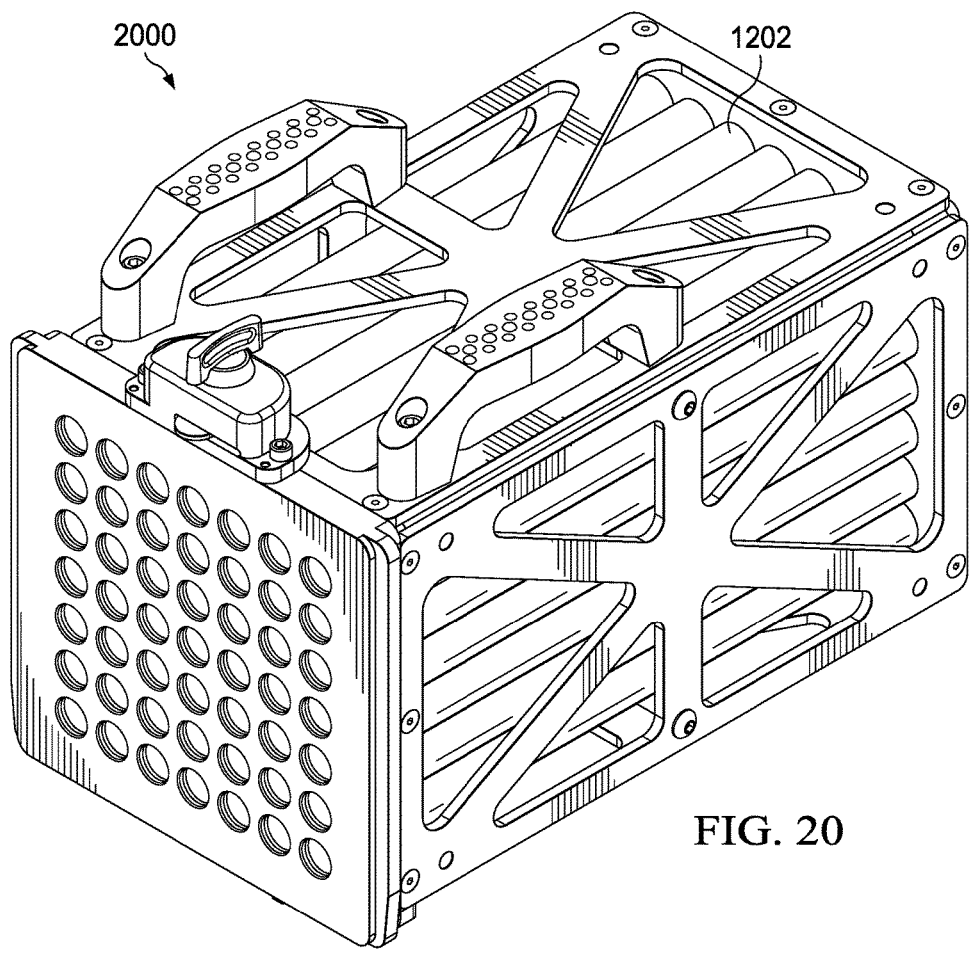
FIG. 20 is an illustration of a collar storage system in operation in accordance with an illustrative embodiment.

Turning now to FIG. 20, an illustration of a collar storage system in operation is depicted in accordance with an illustrative embodiment. Collar storage system 2000 may be a physical implementation of storage location 278 in FIG. 2. Collar storage system 2000 may be associated with multi-function end effector 400 in FIGS. 4-7. For example, collar storage system 2000 may be attached on housing 402 opposite operating window 407. In other illustrative examples, collar storage system 2000 may be independent in a manufacturing environment, instead of being attached to multi-function end effector 400.

Collar storage system 2000 may store a plurality of collars for use by collar installation system 1500 in FIG. 15. Collars, such as collar 1702 in FIG. 17, stored in collar storage system 2000 may each be attached to a respective shuttle, such as shuttle 1704 in FIG. 17, for transportation and handling.

Collar storage system 2000 may store a plurality of collars in columns 2002. A vacuum system may remove plurality of collars in columns 2002 and transport the collars to a transfer mechanism.

Figure 21:
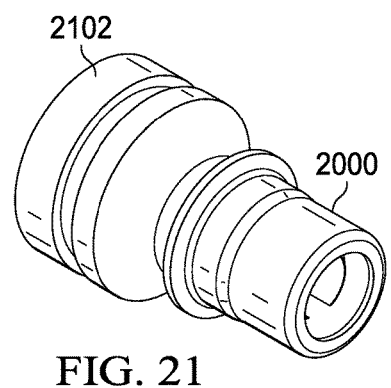
FIG. 21 is an illustration of a collar and an attached shuttle in accordance with an illustrative embodiment.

Turning now to FIG. 21, an illustration of a collar and an attached shuttle is depicted in accordance with an illustrative embodiment. Collar 2100 may be a physical implementation of collar 276 in FIG. 2. Collar 2100 may be transferred by transfer mechanism 1708 in FIG. 17 to collar installation system 1500 in FIG. 15. As depicted, collar 2100 is connected to shuttle 2102.

Shuttle 2102 may be used for transporting and handling collar 2100. Shuttle 2102 may be a recyclable or reusable component. In some illustrative examples, after removing shuttle 2102 from collar 2100, shuttle 2102 may be attached to another collar.

The different components shown in FIG. 1 and FIGS. 3-21 may be combined with components in FIG. 2, used with components in FIG. 2, or a combination of the two. Additionally, some of the components in FIG. 1 and FIGS. 3-21 may be illustrative examples of how components shown in block form in FIG. 2 can be implemented as physical structures.

Figures 22, 23:
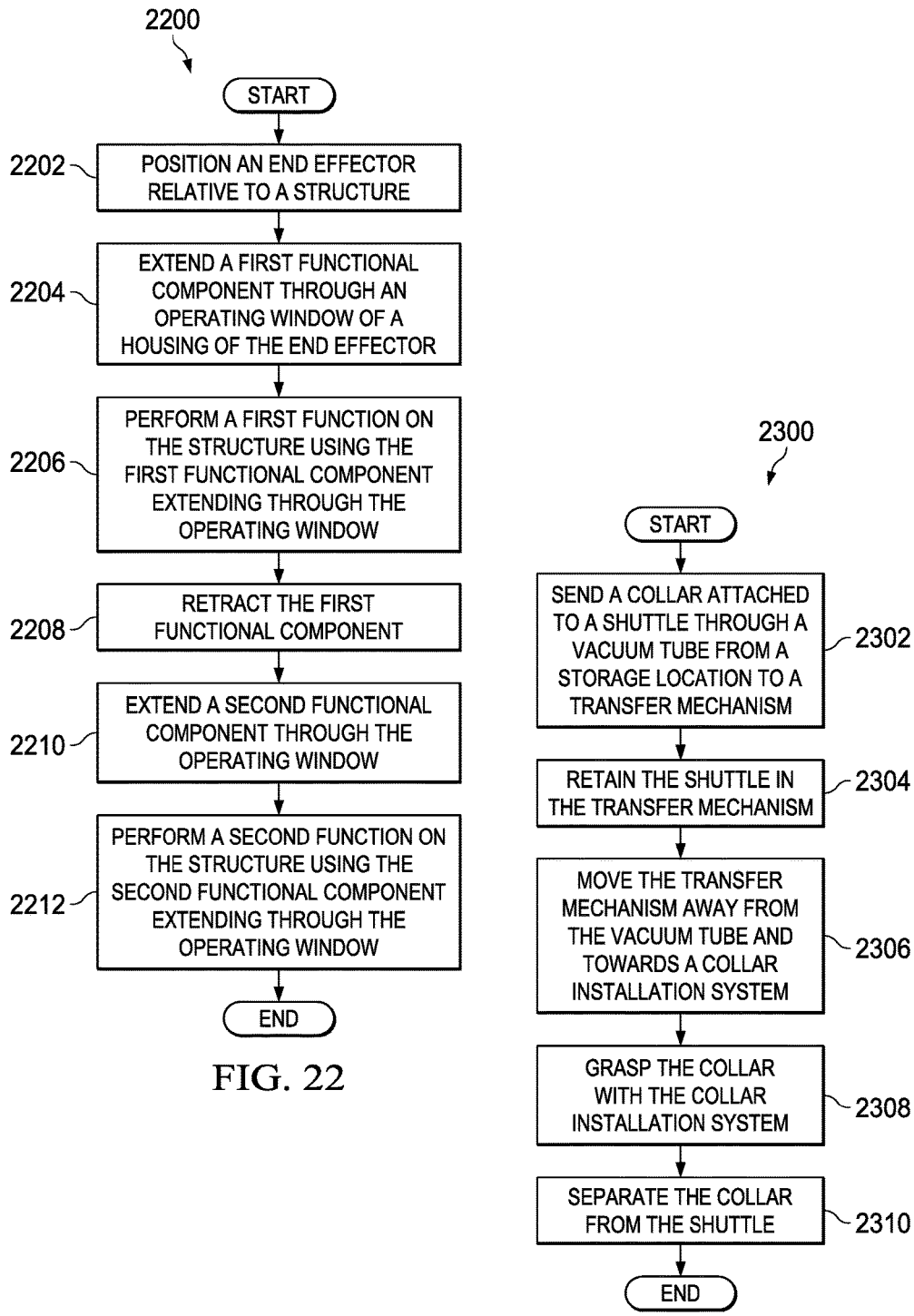
FIG. 22 is an illustration of a flowchart of a method for performing a plurality of functions on a structure in accordance with an illustrative embodiment.
FIG. 23 is an illustration of a flowchart of a method for utilizing a collar in accordance with an illustrative embodiment.

Turning now to FIG. 22, an illustration of a flowchart of a method for performing a plurality of functions on a structure is depicted in accordance with an illustrative embodiment. Process 2200 may be used to perform functions on a structure, such as structure 206 in FIG. 2. Process 2200 may be performed using end effector 210 in FIG. 2. Multi-function end effector 400 in FIG. 4 may be a physical implementation of an end effector for use in process 2200.

Process 2200 first positions an end effector relative to a structure (operation 2202). The end effector may be positioned such that functional components of end effector may be able to reach the structure to perform functions on the structure.

Process 2200 then extends a first functional component through an operating window of a housing of the end effector (operation 2204). In some illustrative examples, the first functional component may be one of an inspection system, a sealant application system, or a collar installation system. Process 2200 performs a first function on the structure using the first functional component extending through the operating window (operation 2206). Process 2200 retracts the first functional component (operation 2208).

Process 2200 then extends a second functional component through the operating window (operation 2210). In some illustrative examples, the second functional component may be one of an inspection system, a sealant application system, or a collar installation system. Process 2200 then performs a second function on the structure using the second functional component extending through the operating window (operation 2212). Afterwards, the process terminates. In some illustrative examples, the first function and the second function may be performed on the same location of the structure. For example, the first function and the second function may be performed on the same fastener. In another illustrative example, the end effector may be moved relative to the structure between performing the first function and performing the second function. For example, the first function may comprise installing a collar on a first fastener, while the second function comprises inspecting a second fastener.

Turning now to FIG. 23, an illustration of a flowchart of a method for utilizing a collar in accordance with an illustrative embodiment. Process 2300 may be used to prepare collar 276 for installation on object 208 in FIG. 2. Process 2300 may involve a collar and attached shuttle, such as collar 2100 and shuttle 2102 in FIG. 21. Process 2300 may be performed by components in FIGS. 17-19.

Process 2300 begins by sending a collar attached to a shuttle through a vacuum tube from a storage location to a transfer mechanism (operation 2302). Process 2300 retains the shuttle in the transfer mechanism (operation 2304). In some illustrative examples, retaining the shuttle in the transfer mechanism comprises sliding a plate of the transfer mechanism to engage a portion of the shuttle. In some illustrative examples, the transfer mechanism comprises a guillotine system that retains the shuttle.

Process 2300 moves the transfer mechanism away from the vacuum tube and towards a collar installation system (operation 2306). In some illustrative examples, the transfer mechanism may move along a track.

Process 2300 grasps the collar with the collar installation system (operation 2308). In some illustrative examples, grasping the collar with the collar installation system comprises clipping a spring-loaded gripper onto the collar. Process 2300 then separates the collar from the shuttle (operation 2310). Afterwards, the process terminates. In some illustrative examples, separating the collar from the shuttle comprises retracting the collar installation system from the transfer mechanism while grasping the collar with the collar installation system.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, process 2200 may further comprise actuating a movement system within the housing such that the second functional component is positioned in an active position relative to the operating window. As another example, the first functional component may be an inspection system comprising a cylindrical housing, a mirror inside the cylindrical housing and positioned at a first end of the cylindrical housing, a light source, and a camera. In this example, extending a first functional component through an operating window of a housing of the end effector comprises positioning the cylindrical housing around a fastener extending through the structure.

In yet a further illustrative example, process 2200 may also comprise extending a third functional component through the operating window, and performing a third function on the structure using the third functional component extending through the operating window. In another illustrative example, process 2200 may further comprise repeating the performance of the first function and the second function on the structure.

In a further example, process 2300 may further comprise moving the transfer mechanism towards the vacuum tube after separating the collar from the shuttle and removing the shuttle from the transfer mechanism using the vacuum tube. In another example, removing the shuttle form the transfer mechanism using the vacuum tube includes returning the shuttle to the storage location, the method further comprising retaining the shuttle in the storage location for future use.

Figure 24:
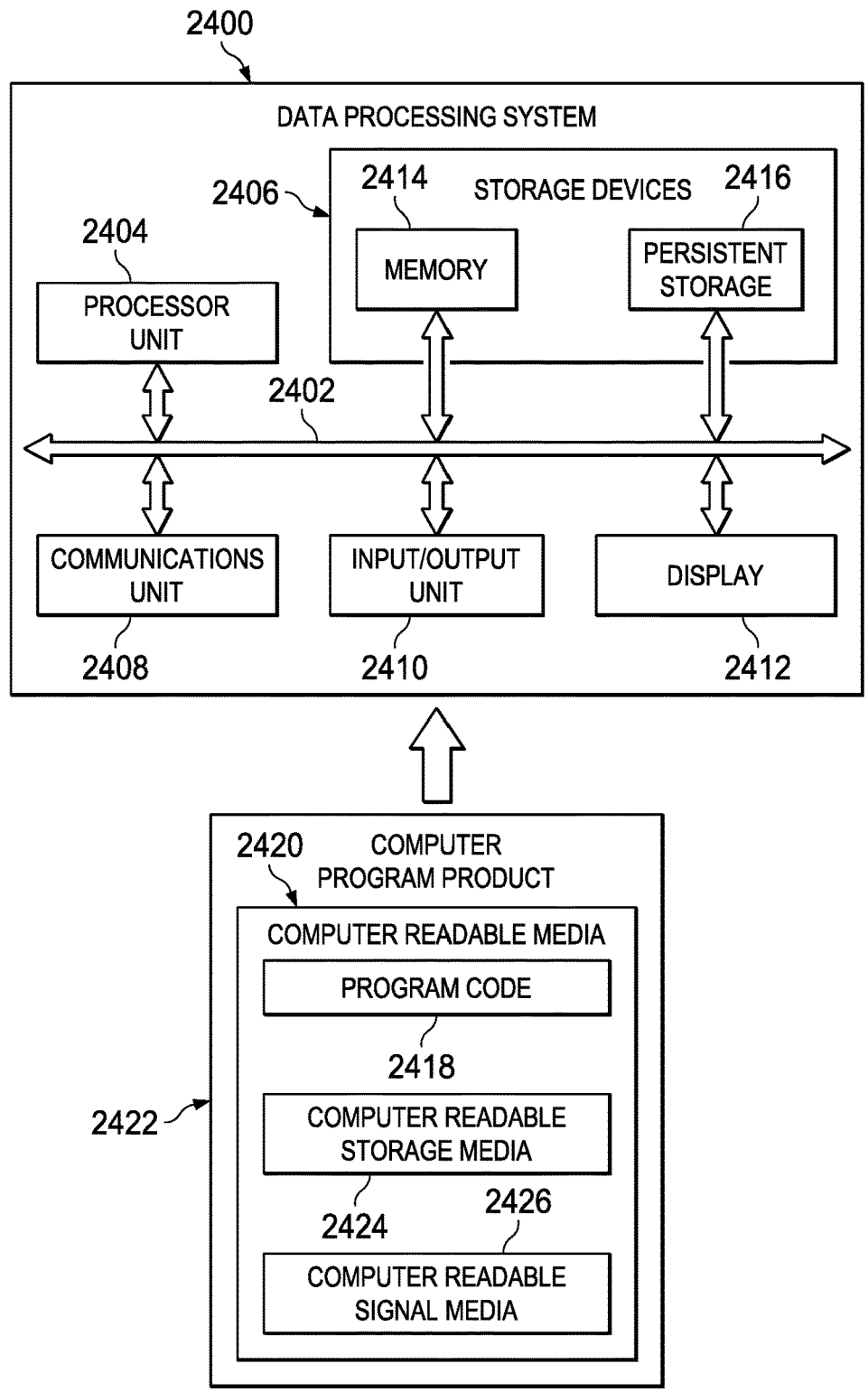
FIG. 24 is an illustration of a data processing system in the form of a block diagram in accordance with an illustrative embodiment.

Turning now to FIG. 24, an illustration of a data processing system in the form of a block diagram is depicted in accordance with an illustrative embodiment. Data processing system 2400 may be used to implement at least one of control system 294 in FIG. 2 or one or more of a set of controllers (not depicted) to control components in FIGS. 4-19. As depicted, data processing system 2400 includes communications framework 2402, which provides communications between processor unit 2404, storage devices 2406, communications unit 2408, input/output unit 2410, and display 2412. In some cases, communications framework 2402 may be implemented as a bus system.

Processor unit 2404 is configured to execute instructions for software to perform a number of operations. Processor unit 2404 may comprise a number of processors, a multi-processor core, and/or some other type of processor, depending on the implementation. In some cases, processor unit 2404 may take the form of a hardware unit, such as a circuit system, an application specific integrated circuit (ASIC), a programmable logic device, or some other suitable type of hardware unit.

Instructions for the operating system, applications, and/or programs run by processor unit 2404 may be located in storage devices 2406. Storage devices 2406 may be in communication with processor unit 2404 through communications framework 2402. As used herein, a storage device, also referred to as a computer readable storage device, is any piece of hardware capable of storing information on a temporary and/or permanent basis. This information may include, but is not limited to, data, program code, and/or other information.

Memory 2414 and persistent storage 2416 are examples of storage devices 2406. Memory 2414 may take the form of, for example, a random access memory or some type of volatile or non-volatile storage device. Persistent storage 2416 may comprise any number of components or devices. For example, persistent storage 2416 may comprise a hard drive, a flash memory, a rewritable optical disk, a rewritable magnetic tape, or some combination of the above. The media used by persistent storage 2416 may or may not be removable.

Communications unit 2408 allows data processing system 2400 to communicate with other data processing systems and/or devices. Communications unit 2408 may provide communications using physical and/or wireless communications links.

Input/output unit 2410 allows input to be received from and output to be sent to other devices connected to data processing system 2400. For example, input/output unit 2410 may allow user input to be received through a keyboard, a mouse, and/or some other type of input device. As another example, input/output unit 2410 may allow output to be sent to a printer connected to data processing system 2400.

Display 2412 is configured to display information to a user. Display 2412 may comprise, for example, without limitation, a monitor, a touch screen, a laser display, a holographic display, a virtual display device, and/or some other type of display device.

In this illustrative example, the processes of the different illustrative embodiments may be performed by processor unit 2404 using computer-implemented instructions. These instructions may be referred to as program code, computer usable program code, or computer readable program code, and may be read and executed by one or more processors in processor unit 2404.

In these examples, program code 2418 is located in a functional form on computer readable media 2420, which is selectively removable, and may be loaded onto or transferred to data processing system 2400 for execution by processor unit 2404. Program code 2418 and computer readable media 2420 together form computer program product 2422. In this illustrative example, computer readable media 2420 may be computer readable storage media 2424 or computer readable signal media 2426.

Computer readable storage media 2424 is a physical or tangible storage device used to store program code 2418 rather than a medium that propagates or transmits program code 2418. Computer readable storage media 2424 may be, for example, without limitation, an optical or magnetic disk or a persistent storage device that is connected to data processing system 2400.

Alternatively, program code 2418 may be transferred to data processing system 2400 using computer readable signal media 2426. Computer readable signal media 2426 may be, for example, a propagated data signal containing program code 2418. This data signal may be an electromagnetic signal, an optical signal, and/or some other type of signal that can be transmitted over physical and/or wireless communications links.

The illustration of data processing system 2400 in FIG. 24 is not meant to provide architectural limitations to the manner in which the illustrative embodiments may be implemented. The different illustrative embodiments may be implemented in a data processing system that includes components in addition to or in place of those illustrated for data processing system 2400. Further, components shown in FIG. 24 may be varied from the illustrative examples shown.

Figure 25:
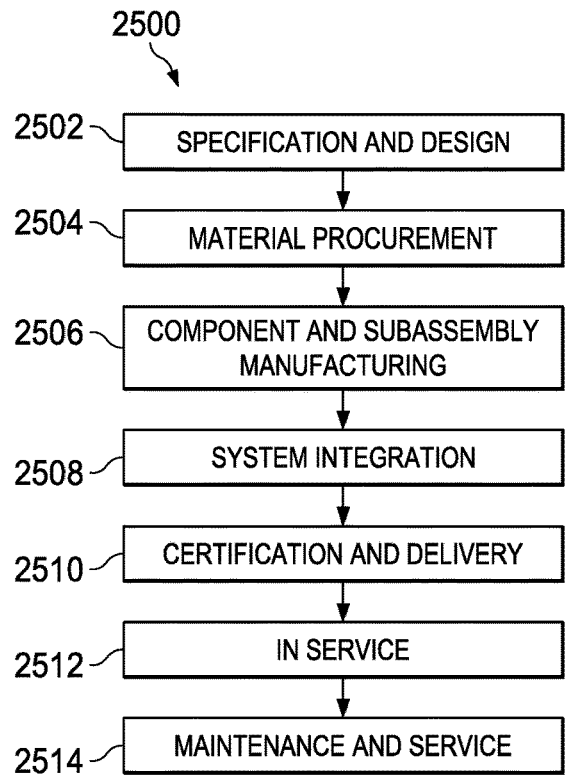
FIG. 25 is an illustration of an aircraft manufacturing and service method in the form of a block diagram in accordance with an illustrative embodiment.
Figure 26:
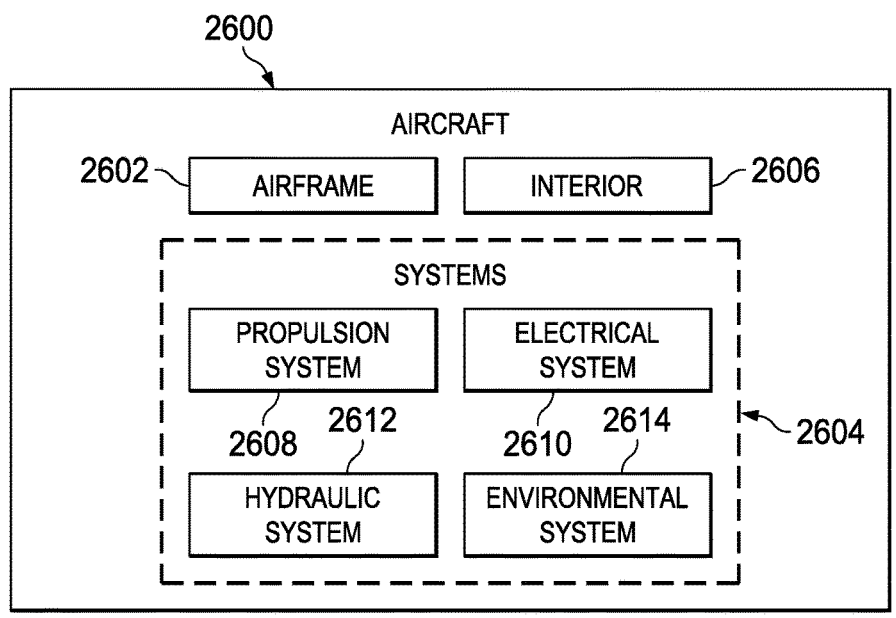
FIG. 26 is an illustration of an aircraft in the form of a block diagram, in which an illustrative embodiment may be implemented.

Illustrative embodiments of the disclosure may be described in the context of aircraft manufacturing and service method 2500, as shown in FIG. 25, and aircraft 2600, as shown in FIG. 26. Turning first to FIG. 25, an illustration of an aircraft manufacturing and service method is depicted in accordance with an illustrative embodiment. During preproduction, aircraft manufacturing and service method 2500 may include specification and design 2502 of aircraft 2600 and material procurement 2504.

During production, component and subassembly manufacturing 2506 and system integration 2508 of aircraft 2600 takes place. Thereafter, aircraft 2600 may go through certification and delivery 2510 in order to be placed in service 2512. While in service 2512 by a customer, aircraft 2600 is scheduled for routine maintenance and service 2514, which may include modification, reconfiguration, refurbishment, and other maintenance or service.

Each of the processes of aircraft manufacturing and service method 2500 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 26, an illustration of an aircraft is depicted in which an illustrative embodiment may be implemented. In this example, aircraft 2600 is produced by aircraft manufacturing and service method 2500 in FIG. 25, and may include airframe 2602 with plurality of systems 2604 and interior 2606. Examples of plurality of systems 2604 include one or more of propulsion system 2608, electrical system 2610, hydraulic system 2612, and environmental system 2614. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 2500 in FIG. 25. One or more illustrative embodiments may be used during component and subassembly manufacturing 2506 in FIG. 25. For example, end effector 210 in FIG. 2 may be used to perform functions during component and subassembly manufacturing 2506. Further, end effector 210 in FIG. 2 may be used to perform functions on an assembly during maintenance and service 2514 in FIG. 25. For example, aircraft 2600 may be inspected during scheduled maintenance for aircraft 2600.

Thus, one or more illustrative embodiments may provide a method and apparatus for performing functions on a structure. The multi-function end effector may perform a plurality of functions on a structure. By using multi-function end effector, manual fastener installation, inspection, and sealant application may be replaced by automated functions. In some illustrative examples, the multi-function end effector may inspect an object, apply sealant to the object, and then install a collar.

In some illustrative examples, multi-function end effector may be C-shaped. When multi-function end effector is C-shaped, other functions may be performed by the opposite side of the multi-function end effector. In some illustrative examples, the functions performed by the opposite side may be complementary to the functions performed by the second side of the multi-function end effector. For example, the fastener inspected by the second side of the multi-function end effector may be inserted by the first side of the multi-function end effector.

The inspection system may be configured to radially inspect a diameter of an object from an axial position. The inspection system includes a cylindrical housing, a mirror inside the cylindrical housing, a light source, and a camera. The inspection system may be a functional component of a multi-function end effector or may be a stand-alone component. When inspection system is a stand-alone component, the inspection system may be positioned by hand or by a robotic system.

When the inspection system is positioned by hand, inspection using the inspection system may have a higher accuracy than conventional manual inspections. Further, positioning inspection system by hand may have improved ergonomics over conventional inspection methods.

The mirror may have at least one of a conical funnel shape or a partial conical funnel shape to reflect images of the object to the camera. Images from the camera may be analyzed to evaluate desirable measurements. One desirable measurement may be a SP2 measurement for a fastener.

The sealant application system is configured to apply a line of sealant onto an elongate object. For example, the sealant application system may apply a line of sealant onto a fastener. The sealant application system includes a sealant source, a rigid housing, and a flexible sealant supply tube. The sealant may flow from the sealant source only through the flexible sealant supply tube prior to application on the object. By only flowing sealant through the flexible sealant supply tube, sealant may be isolated from mechanical components. Further, replacement of the flexible sealant supply tube may be faster, less expensive, and/or more desirable than repairing mechanical components in contact with sealant in conventional sealant systems.

Sealant flow from the sealant source may be controlled by a first control system, such as a pneumatic system. Sealant flow from the flexible sealant supply tube may be controlled by a secondary control system, such as a mechanical valve near the orifice of the sealant application system. The mechanical valve may take the form of a pinch valve that applies pressure to the flexible sealant supply tube.

The sealant application system may be a functional component of a multi-function end effector or may be a stand-alone component. When sealant application system is a stand-alone component, the sealant application system may be positioned by hand or by a robotic system.

When the sealant application system is positioned by hand, sealant application using the sealant application system may have a higher accuracy than conventional manual application. Further, positioning sealant application system by hand may have improved ergonomics over conventional sealant application methods.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An end effector that comprises:
   a C-shape that comprises an end that comprises a housing that comprises an operating window;
   a movement system, within the housing, wherein the movement system comprises a rotation mechanism configured to rotate, within the housing, a plurality of functional components such that a functional component of the plurality of functional components aligns to operate through the operating window; and
   each of the plurality of functional components configured to perform, through the operating window, a function on a structure, the movement system configured such that an activation of the movement system positions the functional component in an active position relative to the operating window.

2. The end effector of claim 1, wherein the movement system comprises a linear slide to extend the functional component through the operating window to perform the function on the structure.

3. The end effector of claim 1, wherein the plurality of the functional components comprises an inspection system, and wherein the inspection system comprises a cylindrical housing, a mirror inside the cylindrical housing and positioned at a first end of the cylindrical housing, a light source, and a camera.

4. The end effector of claim 1, wherein the plurality of the functional components comprises a collar installation system.

5. The end effector of claim 1, wherein the plurality of the functional components comprises a sealant application system, and wherein the sealant application system comprises a sealant source, a rigid housing having an orifice and a channel, and a flexible sealant supply tube positioned in the channel of the rigid housing and connected to the sealant source and the orifice.

6. An end effector that comprises:
   a housing that comprises an operating window; and
   a movement system within the housing, such that the movement system comprises a rotation mechanism configured to rotate, within the housing, a plurality of functional components such that a functional component of the plurality of functional components aligns to operate through the operating window, such that the functional components comprise:
   an inspection system associated with the movement system;
   a collar installation system associated with the movement system; and
   a sealant application system associated with the movement system, wherein an activation of the movement system positions any of: the inspection system, the collar installation system, or the sealant application system, in an active position relative to the operating window.

7. The end effector of claim 6, wherein the inspection system comprises: a cylindrical housing, a mirror inside the cylindrical housing and positioned at a first end of the cylindrical housing, a light source, and a camera.

8. The end effector of claim 7, wherein the mirror comprises a conical funnel shape.

9. The end effector of claim 6, wherein the sealant application system comprises: a sealant source, a rigid housing that comprises an orifice and a channel, and a flexible sealant supply tube positioned in the channel of the rigid housing and connected to the sealant source and the orifice.

10. The end effector of claim 6, wherein the collar installation system comprises a spring-loaded gripper configured to grasp a collar.

11. The end effector of claim 10, further comprising the collar installation system configured to remove the collar from a transfer mechanism, wherein the transfer mechanism comprises a plate configured to slide to engage a portion of a shuttle attached to the collar.

12. An end effector that comprises a movement system configured to rotate, within a housing, a plurality of functional components such that a functional component of the plurality of functional components aligns to operate through an operating window in the housing, such that the functional component comprises a sealant application system that comprises:
   a sealant source;
   a rigid housing having an orifice and a channel; and
   a flexible sealant supply tube positioned in the channel of the rigid housing and connected to the sealant source and the orifice.

13. The sealant application system of claim 12 further comprising:
   a pinch valve associated with the rigid housing, wherein the flexible sealant supply tube is positioned within the pinch valve.

14. The sealant application system of claim 13, wherein the pinch valve is positioned within the rigid housing.

15. The sealant application system of claim 12, wherein the channel extends longitudinally along a first surface and a second surface of the rigid housing, and wherein the first surface is opposite the second surface.

16. The sealant application system of claim 12, wherein the rigid housing comprises a substantially cylindrical portion and a protrusion extending longitudinally from the substantially cylindrical portion, and wherein the orifice is positioned within the protrusion.

17. The sealant application system of claim 12 further comprising:
a pneumatic system associated with the sealant source and configured to control sealant flow.

18. An end effector that comprises a movement system configured to rotate, within a housing, a plurality of functional components such that a functional component of the plurality of functional components aligns to operate through an operating window in the housing, such that the functional component comprises a sealant application system associated with an inspection system that comprises:
a cylindrical housing;
a mirror inside the cylindrical housing and positioned at a first end of the cylindrical housing;
a light source; and
a camera.

19. The inspection system of claim 18, wherein the camera is associated with a second end of the cylindrical housing, wherein the second end of the cylindrical housing is opposite the first end.

20. The inspection system of claim 19, wherein the light source is associated with the second end of the cylindrical housing.

21. The inspection system of claim 18, wherein the mirror has a conical funnel shape.

22. The inspection system of claim 18, wherein the mirror has a partial conical funnel shape.

23. The inspection system of claim 18, wherein the inspection system further comprises the movement system configured to move the cylindrical housing along a longitudinal axis of the cylindrical housing.

24. The inspection system of claim 18, wherein the inspection system is configured to radially inspect a diameter of an object from an axial position.

25. A method comprising:
positioning an end effector, comprising a movement system configured to rotate, within a housing, a plurality of functional components such that a functional component of the plurality of functional components aligns to operate through an operating window in the housing, such that the functional components comprise, a sealant application system, and an inspection system, relative to a structure;
extending a first functional component through the operating window;
performing a first function on the structure using the first functional component extending through the operating window;
retracting the first functional component;
extending a second functional component through the operating window; and
performing a second function on the structure using the second functional component extending through the operating window.

26. The method of claim 25, further comprising:
the movement system comprising at least one of a rotation mechanism or a number of linear slides; and
actuating the movement system within the housing such that the second functional component is positioned in an active position relative to the operating window.

27. The method of claim 25, further comprising the first functional component comprising the inspection system comprising: a cylindrical housing, a mirror inside the cylindrical housing and positioned at a first end of the cylindrical housing, a light source, and a camera, and wherein extending the first functional component through the operating window of the housing of the end effector comprises positioning the cylindrical housing around a fastener extending through the structure.

28. The method of claim 27, further comprising the second functional component comprising the sealant application system comprising: a sealant source, a rigid housing having an orifice and a channel, and a flexible sealant supply tube positioned in the channel of the rigid housing and connected to the sealant source and the orifice.

29. A method comprising:
sending a collar attached to a shuttle through a vacuum tube from a storage location to a transfer mechanism within a housing of an end effector comprising: a movement system configured to rotate, within the housing, a plurality of functional components such that a functional component of the plurality of functional components aligns to operate through an operating window in the housing such that the plurality of functional components comprise, a sealant application system, and an inspection system;
retaining the shuttle in the transfer mechanism;
moving the transfer mechanism away from the vacuum tube and towards a collar installation system;
grasping the collar with the collar installation system; and
separating the collar from the shuttle.

30. The method of claim 29, wherein retaining the shuttle in the transfer mechanism comprises sliding a plate of the transfer mechanism to engage a portion of the shuttle.

31. The method of claim 29, wherein the transfer mechanism comprises a guillotine system that retains the shuttle.

32. The method of claim 29, wherein grasping the collar with the collar installation system comprises clipping a spring-loaded gripper onto the collar.

33. The method of claim 29, wherein separating the collar from the shuttle comprises retracting the collar installation system from the transfer mechanism while grasping the collar with the collar installation system.

34. The method of claim 29 further comprising:
moving the transfer mechanism towards the vacuum tube after separating the collar from the shuttle; and
removing the shuttle from the transfer mechanism using the vacuum tube.

35. The method of claim 34, further comprising:
returning the shuttle to the storage location: and
retaining the shuttle in the storage location for future use.

* * * * *